United States Patent [19]
Kojima et al.

[11] Patent Number: 5,584,012
[45] Date of Patent: Dec. 10, 1996

[54] CACHE CONTROL METHOD AND ROTARY STORAGE DEVICE HAVING CACHE CONTROL

[75] Inventors: Akira Kojima; Tsuneo Hirose; Masahiko Sato; Toshiyuki Haruna; Tetsuzo Kobashi, all of Odawara, Japan

[73] Assignee: Hitachi, Ltd., Tokyo, Japan

[21] Appl. No.: 255,942

[22] Filed: Jun. 7, 1994

[30] Foreign Application Priority Data

Jun. 8, 1993 [JP] Japan .................. 5-136320

[51] Int. Cl.⁶ .................................. G06F 12/08
[52] U.S. Cl. .............. 395/449; 364/243.41; 364/243.44; 364/260; 364/DiG. 1
[58] Field of Search .............. 395/800, 10, 449

[56] References Cited

U.S. PATENT DOCUMENTS

| | | | |
|---|---|---|---|
| 4,636,946 | 1/1987 | Hartung | 395/800 |
| 4,843,541 | 6/1989 | Bean | 395/425 |
| 5,353,410 | 10/1994 | Macon | 395/275 |
| 5,410,666 | 4/1995 | Nakano | 395/425 |

FOREIGN PATENT DOCUMENTS 60-258661  12/1985  Japan .

*Primary Examiner*—Eric Coleman
*Attorney, Agent, or Firm*—Antonelli, Terry, Stout & Kraus

[57] ABSTRACT

A cache control method and a rotary storage device are capable at a low cost, of improving the hit rate and minimizing the processing time in the event of a miss hit. The rotary storage devices includes a plurality of disk units, an upper-level interface circuit, a cache controller, a cache memory, and a control processor. In each disk unit, the storage area of each disk is subdivided into an ordinary user data area and a secondary cache data storage area including a group of consecutive cylinders. Data which has overflowed from the cache memory is sequentially written in the secondary cache data storage area so as to be later transferred therefrom to areas of the user data area according to addresses inherent thereto when traffic of upper-level input/output processing is relatively low. In the case of a miss hit of the cache memory during a data read operation, access operations are performed first to the secondary cache data storage area and then to the user data area.

32 Claims, 23 Drawing Sheets

FIG. 4

SECONDARY CACHE TABLE (DISK) 32b

|   | 0 | 1 | 2 | 3 | 4 | 5 | 6 | ...... | C-1 |
|---|---|---|---|---|---|---|---|---|---|
| 0 | F2 | F2 | F2 | F2 | F2 | F2 | F2 | | F2 |
| 1 | F2 | F2 | F2 | F2 | F2 | F2 | F2 | | F2 |
| 2 | F2 | F2 | F2 | F2 | F2 | F2 | F2 | | F2 |
| 3 | F2 | F2 | F2 | F2 | F2 | F2 | F2 | | F2 |
| 4 | F2 | F2 | F2 | F2 | F2 | | | | |
| ...... | | | | | | | | | |
| R-1 | F2 | F2 | F2 | F2 | F2 | F2 | F2 | | F2 |

SECONDARY CACHE DATA (DISK) 6xa

|   | 0 | 1 | 2 | 3 | 4 | 5 | 6 | ...... | C-1 |
|---|---|---|---|---|---|---|---|---|---|
| 0 | D | D | D | D | D | D | D | | D |
| 1 | D | D | D | D | D | D | D | | D |
| 2 | D | D | D | D | D | D | D | | D |
| 3 | D | D | D | D | D | D | D | | D |
| 4 | D | D | D | D | D | | | | |
| ...... | | | | | | | | | |
| R-1 | D | D | D | D | D | D | D | | D |

SECONDARY CACHE CONTROL FLAG (F2) 32b-1

| D2 | O2 | LBA |
|---|---|---|

- LBA ........ LOGICAL ADDRESS
- O2 ........ INDICATES THAT SECONDARY CACHE DATA OVERFLOWED FROM CACHE
- D2 ........ INDICATES WHETHER OR NOT USER DATA ON DISK MATCHES SECONDARY CACHE DATA

① DISK WRITE : COMMAND TERMINATION WHEN WRITE DATA IS WRITTEN IN CACHE MEMORY

② DISK READ: DATA #a IS TO BE SENT FROM CACHE MEMORY BUT IS MISSING IN CACHE DATA #d AND DATA #e ARE SENT FROM DISK VIA CACHE TO HOST

③ SECONDARY CACHE WRITE : AT POINT②, WRITE OPERATION IS REQUIRED UP TO SECONDARY CACHE DUE TO UPPER-LEVEL COMMAND OR ACCORDING TO JUDGEMENT OF CONTROLLER

④ DISK WRITE : AT POINT③, WRITE COMMAND IS RECEIVED FROM UPPER-LEVEL APPARATUS

⑤ DISK READ: AT POINT④, READ COMMAND IS RECEIVED FROM UPPER-LEVEL APPARATUS

FIG. 10

⑥ DISK WRITE : AT POINT ⑤, CONTENTS OF SECONDARY CACHE ARE REQUIRED TO BE WRITTEN DUE TO UPRER-LEVEL COMMAND OR ACCORDING TO JUDGEMENT OF CONTROLLER

UPPER-LEVEL COMMAND

CACHE MEMORY

CONTROL TABLE

| LBA | C2 | CD |
|-----|-----|-----|
| a | 0 | 0 |
| g | 0 | 0 |
| b | 1 | 0→1 |
| h | 0 | 1 |
| e | 1 | 1 |
| f | 0 | 0 |

CACHE DATA

| aaa2 |
|------|
| ggg1 |
| bbb1 |
| hhh0 |
| eee0 |
| fff1 |

SECONDARY CACHE (DISK)

CONTROL TABLE

| LBA | D2 | O2 |
|-----|-----|-----|
| a | 0→1 | 0 |
| b | 0→1 | 0 |
| c | 0→1 | 1 |
| d | 1 | 1 |
| e | 1 | 0 |

SECONDARY CACHE DATA

| aaa1 |
|------|
| bbb1 |
| ccc1 |
| ddd0 |
| eee0 |

USER DATA

| #d | (ddd0) |
| #b | (bbb0→1) |
| #g | (ggg0) |
| #a | (aaa0→1) |
| #f | (fff0) |
| #c | (ccc0→1) |
| #e | (eee0) |
| #h | (hhh0) |

⑦ DISK WRITE : AT POINT⑤, CONTENTS OF CACHE MEMORY ARE REQUIRED TO BE WRITTEN ON DISK DUE TO UPPER-LEVEL COMMAND OR ACCORDING TO JUDGEMENT OF CONTROLLER CONDUCT FOLLOWING OPERATION AFTER POINT⑥

FIG. 12

UPDATE OF CONTROL TABLE THROUGH PROCESSING

PROCESSING①: WR COMMAND (WITH AVAILABLE ARE IN CACHE)

| CACHE CONTROL FLAG | | SECONDARY CACHE CONTROL FLAG | | DATA VALIDITY LATEST : ○ | | | DATA UPDATE | FLAG VALUES AFTER UPDATE C2,CD,D2,O2 |
|---|---|---|---|---|---|---|---|---|
| C2 | CD | D2 | O2 | CACHE | 2nd-C | DISK | PATH | |
| 0 | 0 | 0 | 0 | ○ | | | UPPER LEVEL→CACHE | 0000 |
| 0 | 0 | 0 | 1 | | ○ | | UPPER LEVEL→CACHE | 0000 |
| 0 | 0 | 1 | 0 | ○ | | | UPPER LEVEL→CACHE | 0010 |
| 0 | 0 | 1 | 1 | | ○ | | UPPER LEVEL→CACHE | 0010 |
| 0 | 1 | 0 | 0 | ○ | | ○ | UPPER LEVEL→CACHE | 0000 |
| 1 | 0 | 0 | 0 | ○ | ○ | ○ | UPPER LEVEL→CACHE | 0000 |
| 1 | 1 | 1 | 0 | | ○ | ○ | UPPER LEVEL→CACHE | 0010 |
| MISSING IN ANY CACHE | | | | | | | UPPER LEVEL→CACHE | 0000 |

FIG. 13

UPDATE OF CONTROL TABLE THROUGH PROCESSING

PROCESSING④ : WR COMMAND (OVERFLOW FROM CACHE)

| CACHE CONTROL FLAG | | SECONDARY CACHE CONTROL FLAG | | | DATA VALIDITY LATEST : ○ | | | DATA UPDATE | | FLAG VALUES AFTER UPDATE |
|---|---|---|---|---|---|---|---|---|---|---|
| C2 | CD | D2 | O2 | | CACHE | 2nd-C | DISK | PATH | | C2,CD,D2,O2 |
| 0 | 0 | 0 | 0 | | ○ | | | CACHE→2nd-C | | 0001 |
| 0 | 0 | 0 | 1 | | | ○ | | NOT APPLICABLE | | |
| 0 | 0 | 1 | 0 | | ○ | | | CACHE→2nd-C | | 0001 |
| 0 | 0 | 1 | 1 | | | ○ | ○ | NOT APPLICABLE | | |
| 0 | 1 | 0 | 0 | | ○ | | ○ | CACHE→2nd-C | | 0011 |
| 1 | 0 | 0 | 0 | | ○ | ○ | | PROCESSING NOT REQUIRED | | 0001 |
| 1 | 1 | 1 | 0 | | ○ | ○ | ○ | UPPER LEVEL→CACHE | | 0010 |
| MISSING IN ANY CACHE | | | | | | | | NOT APPLICABLE | | |

FIG. 14

UPDATE OF CONTROL TABLE THROUGH PROCESSING

PROCESSING⑤ : RD COMMAND

| CACHE CONTROL FLAG | | SECONDARY CACHE CONTROL FLAG | | DATA VALIDITY  LATEST : ○ | | | DATA UPDATE PATH | FLAG VALUES AFTER UPDATE C2,CD,D2,O2 |
|---|---|---|---|---|---|---|---|---|
| C2 | CD | D2 | O2 | CACHE | 2nd-C | DISK | | |
| 0 | 0 | 0 | 0 | ○ | | | CACHE→UPPER LEVEL | 0000 |
| 0 | 0 | 0 | 1 | | ○ | | 2nd-C→UPPER LEVEL | 1000 |
| 0 | 0 | 1 | 0 | ○ | | | CACHE→UPPER LEVEL | 0010 |
| 0 | 0 | 1 | 1 | | ○ | ○ | 2nd-C→UPPER LEVEL | 1110 |
| 0 | 1 | 0 | 0 | ○ | | ○ | CACHE→UPPER LEVEL | 0100 |
| 1 | 0 | 0 | 0 | ○ | ○ | ○ | CACHE→UPPER LEVEL | 1000 |
| 1 | 1 | 1 | 0 | ○ | ○ | ○ | CACHE→UPPER LEVEL | 1110 |
| MISSING IN ANY CACHE | | | | | | ○ | DISK→UPPER LEVEL | 0100 |

FIG. 15

UPDATE OF CONTROL TABLE THROUGH PROCESSING

PROCESSING⑥ : CONTENTS OF SECONDARY CACHE ARE SAVED ON DISK

| CACHE CONTROL FLAG | | SECONDARY CACHE CONTROL FLAG | | DATA VALIDITY LATEST : ○ | | | DATA UPDATE | FLAG VALUES AFTER UPDATE |
|---|---|---|---|---|---|---|---|---|
| C2 | CD | D2 | O2 | CACHE | 2nd-C | DISK | PATH | |
| 0 | 0 | 0 | 0 | ○ | | | NOT APPLICABLE | C2,CD,D2,O2 |
| 0 | 0 | 0 | 1 | | ○ | | 2nd-C→DISK | 0011 |
| 0 | 0 | 1 | 0 | ○ | | | NOT APPLICABLE | |
| 0 | 0 | 1 | 1 | | ○ | ○ | PROCESSING NOT REQUIRED | 0011 |
| 0 | 1 | 0 | 0 | ○ | ○ | ○ | NOT APPLICABLE | |
| 1 | 0 | 0 | 0 | ○ | ○ | | 2nd-C→DISK | 1110 |
| 1 | 1 | 1 | 0 | | | ○ | PROCESSING NOT REQUIRED | 1110 |
| MISSING IN ANY CACHE | | | | | | | NOT APPLICABLE | |

FIG. 16

UPDATE OF CONTROL TABLE THROUGH PROCESSING
PROCESSING⑦ : CONTENTS OF CACHE ARE SAVED ON DISK
(PROCESSING⑥ IS EXECUTED IN POSTPROCESSING)

| CACHE CONTROL FLAG | | SECONDARY CACHE CONTROL FLAG | | DATA VALIDITY LATEST : ○ | | | DATA UPDATE | | FLAG VALUES AFTER UPDATE |
|---|---|---|---|---|---|---|---|---|---|
| C2 | CD | D2 | O2 | CACHE | 2nd-C | DISK | PATH | | C2,CD,D2,O2 |
| 0 | 0 | 0 | 0 | ○ | | | CH→2C→DK | | 1110 |
| 0 | 0 | 0 | 1 | | ○ | | ONLY PROCESSING④ | | 0011 |
| 0 | 0 | 1 | 0 | ○ | | | CH→2C→DK | | 1110 |
| 0 | 0 | 1 | 1 | | ○ | ○ | PROCESSING NOT REQUIRED | | 0011 |
| 0 | 1 | 0 | 0 | ○ | ○ | ○ | PROCESSING NOT REQUIRED | | 0100 |
| 1 | 0 | 0 | 0 | ○ | ○ | | ONLY PROCESSING④ | | 1110 |
| 1 | 0 | 1 | 0 | | | ○ | PROCESSING NOT REQUIRED | | 1110 |
| 1 | 1 | MISSING IN ANY CACHE | | | | ○ | PROCESSING NOT REQUIRED | | MISSING IN ANY CACHE |

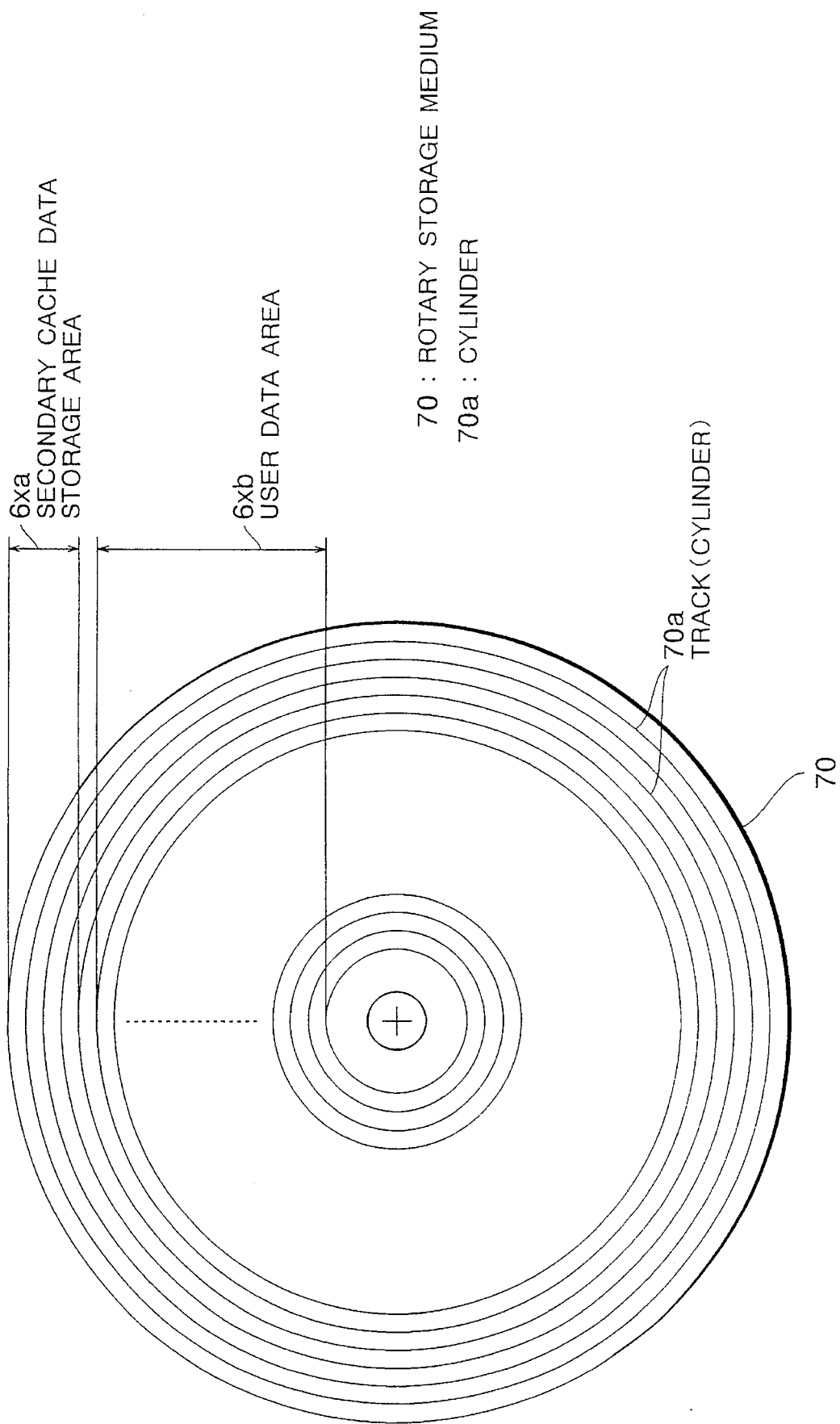

CACHE CONTROL METHOD AND ROTARY STORAGE DEVICE HAVING CACHE CONTROL

BACKGROUND OF THE INVENTION

The present invention relates to a disk cache control method and a rotary storage device, and in particular, to a disk cache control technology effectively applicable to a magnetic disk subsystem or the like to be connected as an external storage device to an information processing apparatus.

For example, in the field of information processing technology in which distributed computer processing utilizes a disk storage media for a storage device, there has been required a disk subsystem which is compatible with a high-speed random data processing. In this case, to prevent elongation of the mean processing time associated with a mechanical seek time and a latency in the random read and write operations requested from a higher-level apparatus, such as a central processing unit (CPU), to a disk, there has been employed in a data transfer path to the disk unit a cache memory in the form of a semiconductor memory, and having a higher operation speed as compared with the disk storage, thereby increasing the processing speed. However, since the semiconductor memory has a bit cost which is significantly higher than that of the disk medium, the feasible capacity of the cache memory is limited in the present state of the art.

FIG. 23 shows the general configuration of an example of a disk device to be operated in association with a cache memory. When the disk device receives a command or instruction for the writing of data via an upper-level interface circuit 102 from a host computer 101, a CPU 107 writes the data via a cache controller 103 in a cache memory 104 at an address specified by the instruction. When the disk device receives a read instruction from the host computer 101, the CPU 107 references a cache control table in the cache controller 103. If the data exists in the cache memory 104, namely, in a case of a "cache hit" the CPU 107 activates the cache controller 103 to transmit the data from the cache memory 104 to the host computer 101.

If the data requested by the read instruction is missing in the cache memory 104, namely, in the case of a "cache miss" the CPU 107 activates a disk controller 105 to access the disk devices 1061 to 106N (N may be "one" depending on cases) to read data from the pertinent address so as to store the obtained data via the cache controller 103 in the cache memory 104 and to concurrently transfer the read data via the upper-level interface circuit 102 to the host computer 101.

There may also be considered a method in which operations of the upper-level interface circuit 102, the cache controller 103, and the disk controller 105 are autonomously conducted without using instructions from the CPU 107 and without necessitating the monitoring operation of the CPU 107.

In the write operation, even when a cache hit occurs for each access request (hit rate=100%) in the cache memory 104, it is necessary to finally write each data item in the destination storage position in the disk devices 1061 to 106N in a random fashion.

Further, in the case where a miss hit occurs due to insufficient capacity of the cache memory 104 or in a case where write cache data is written on a disk, random processing in the disk devices 1061 to 106N also must be performed.

On the other hand, in JP-A-60-258661 entitled "Cache Memory Controller", there have been described a scheme for utilization of a cache memory to minimize the number of accesses to disks and an efficient method of controlling the cache memory. However, the control operation for reading data in the event of a miss hit of the cache, the control operation to be effected when power is interrupted, and the control operation for writing cache data on a disk in response to a processing request from a higher-level apparatus are substantially identical to those employed in the example of FIG. 23 in that the access operations are actually conducted according to random addresses on the disks.

In the prior art referenced above, when the capacity of the cache memory is increased to improve the hit rate, the cost of the apparatus inevitably increases substantially. Moreover, in a case where a disk write operation is required due to a miss hit in the cache memory during a data write operation, there occurs a random access to the disk. Namely, the seek time and the latency remain as relevant factors, which leads to a problem of a longer processing time.

For example, in the case where the cache capacity is 16 megabytes (MB) and the data processing unit includes 16 kilobytes (KB), when it is desired to save data in a termination processing of the system, there occur 1000 input/output (I/O) operations. Each I/O operation takes a period of time represented as follows.

I/O processing time of each I/O operation =

(mean seek time of disk device) + (latency) +

(disk write time of 16 KB data) + (overhead time of controller)

Assuming that the values of the above items are applied to a 5-inch disk device with a rotary speed of 5400 rotations per minute (RPM), as generally used, the I/O processing time $T_{pc}$ of each I/O operation is as follows.

$$\begin{aligned} T_{pc} &= 12.8 \text{ milliseconds (ms)} + 11.1 \text{ ms}/2 + \\ &\quad 11.1 \text{ ms} \times 32/80 + \\ &\quad 1 \text{ ms} \\ &= 23.8 \text{ ms} \end{aligned}$$

In the disk device with a rotary speed of 5400 rpm, one disk rotation takes 11.1 ms. Half the rotation period is consumed by the latency. In a case where each sector includes 512 bytes and each track has 80 sectors by way of example, the period of time required to access 16 kilobytes (=32 sectors) is expressed as 32/80 × (one disk rotation time).

In consequence, the processing time necessary for 1000 I/O operations is 23.8 seconds in this apparatus.

SUMMARY OF THE INVENTION

It is therefore an object of the present invention to provide a method of and an apparatus for controlling a disk cache, which are capable of improving at a low cost the hit rate and minimizing the processing time at the time of a miss hit.

Another object of the present invention is to provide a method of and an apparatus for controlling a disk cache which are capable of effectively improving the hit rate according to various modes of access of the rotary storage media.

Still another object of the present invention is to provide a method of and an apparatus for controlling a disk cache, which are capable of minimizing the period of time necessary to save data from a cache memory onto a rotary storage medium.

Still a further another object of the present invention is to provide a rotary storage device, which is capable of improving at a low cost the hit rate and minimizing the processing time at the time of a miss hit.

Another object of the present invention is to provide a cache control method, which is capable of effectively improving the hit rate according to various modes of access of a rotary storage media.

Still another object of the present invention is to provide a rotary storage device, which is capable of minimizing the period of time necessary to save data from a cache memory onto a rotary storage medium.

The foregoing and other objects and novel features of the present invention will be understood from the following detailed description when read in connection with the accompanying drawings.

According to an aspect of the present invention, there is provided a cache control method in which, in a transfer path for data communicated between a rotary storage medium and an upper-level apparatus, there is disposed a cache memory to hold therein a copy of the data in the rotary storage medium such that for at least either one of a data read request from the upper-level apparatus to read data from the rotary storage medium and a data write request from the upper-level apparatus to write data in the rotary storage medium, a response operation thereto is performed by use of the cache memory and a cache controller. The method includes the steps of subdividing the rotary storage medium into an ordinary user area and a secondary cache area and executing at least either one of a write processing to save in the rotary storage medium data which has overflowed from the cache memory and a read processing, when data requested by the data read request is missing in the cache memory, to read the data from the rotary storage medium, the write or read processing being executed preferentially for the secondary cache area as compared to the ordinary user's area.

According to another aspect of the present invention, there is provided a rotary storage device including a rotary storage medium and a cache memory disposed in a transfer path of data communicated between the rotary storage medium and an upper-level apparatus, the cache memory holding therein a copy of the data in the rotary storage medium, such that for at least either one of a data read request from the upper-level apparatus to read data from the rotary storage medium and a data write request from the upper-level apparatus to write data in the rotary storage medium, a response thereto is achieved by use of the cache memory. The rotary storage device includes subdividing means for subdividing the rotary storage medium into an ordinary user area and a secondary cache area in a program-controlled manner and preferential execution means for executing at least either one of a write processing to save in the rotary storage medium data which has overflowed from the cache memory and a read processing, when data requested by the data read request is missing in the cache memory, to read the data from the rotary storage medium, the write or read processing being executed preferentially for the secondary cache area.

In the cache control method and the rotary storage device according to the present invention, even when an overflow of data occurs in a cache memory and the data is required to be written in a rotary storage medium, the data write operation is conducted not with actual random addresses in the ordinary user area on the rotary storage medium, but with successive addresses of a "secondary cache area" which is disposed, for example, in a range of several cylinders from the outer-most peripheral cylinder of the rotary storage medium, and which is not accessible from the user. As a result, the access to the rotary storage medium can be accomplished as a sequential operation and hence the total time including the seek time and the latency is minimized, thereby reducing the processing time.

The operation to write data on the rotary storage medium according to the actual addresses is achieved during a period of time when the traffic of the I/O operations from upper-level apparatuses is relatively decreased.

Moreover, in the case where data missing in the cache memory and existing in the "secondary cache area" is requested from an upper-level apparatus, the data is transferred from the secondary cache area to the cache memory. In this situation, since the data access is carried out to a limited range of the rotary storage medium, the transfer operation is accomplished at a high speed. Namely, the operation can be achieved in a shorter period of time as compared with the operation to access the actual user area.

For example, in the case of a banking online system, data accesses for transactions of online terminals are conducted to the cache memory and the "secondary cache area". After the online operation is finished, the data written in these cache memories are moved therefrom into the actual user areas on the rotary storage media.

BRIEF DESCRIPTION OF THE DRAWINGS

These and other objects and advantages of the present invention will become apparent by reference to the following description and accompanying drawings wherein:

FIG. 4 is a diagram showing an example of a secondary cache control table for use in controlling a secondary cache data area;

FIG. 10 is a schematic diagram showing still another example of transition of data transfer processing between the cache memory, the secondary cache data area, and the user data area;

FIG. 12 is a schematic diagram showing an example of the update state of the cache control table and the secondary cache control table in the data transfer processing between the cache memory, the secondary cache data area, and the user data area;

FIG. 13 is a schematic diagram showing another example of the update state of the cache control table and the secondary cache control table in the data transfer processing between the cache memory, the secondary cache data area, and the user data area;

FIG. 14 is a schematic diagram showing still another example of the update state of the cache control table and the secondary cache control table in the data transfer processing between the cache memory, the secondary cache data area, and the user data area;

FIG. 15 is a schematic diagram showing a further example of the update state of the cache control table and the secondary cache control table in the data transfer processing between the cache memory, the secondary cache data area, and the user data area;

FIG. 16 is a schematic diagram showing another example of the update state of the cache control table and the secondary cache control table in the data transfer processing between the cache memory, the secondary cache data area, and the user data area;

FIG. 17 is a schematic block diagram showing an example of a rotary storage medium in the rotary storage device in an embodiment according to the present invention;

DESCRIPTION OF THE PREFERRED EMBODIMENTS

Referring now to the accompanying drawings, description will be given in detail of embodiments according to the present invention.

Embodiment 1

Figure 1:
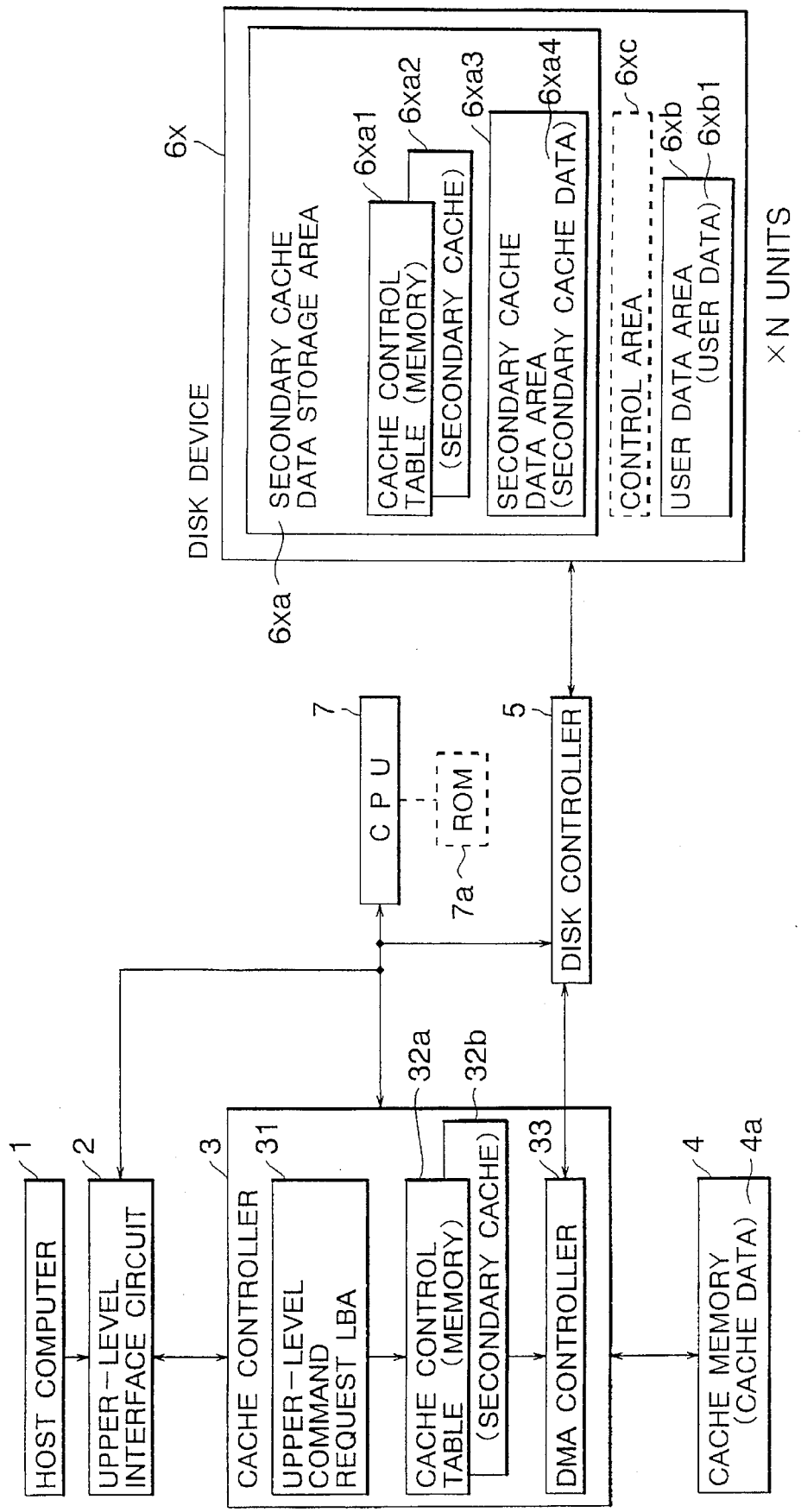
FIG. 1 is a schematic block diagram showing an example of a rotary storage device in an embodiment according to the present invention.

FIG. 1 shows in a block diagram an example of the structure of a rotary storage device using the cache control method according to the present invention.

The rotary storage device includes a plurality of disk devices $6x$ (x=1 to N) each having a rotary storage medium 70, such as a magnetic disk (of which examples are shown later in FIGS. 17 to 20), and each operating under control of a disk controller 5. A higher-level interface circuit 2 for controlling communication of commands and data between a host computer 1 and the rotary storage device, a cache controller 3 and a cache memory 4 are disposed in a data transfer path between the interface circuit 2 and the disk devices $6x$ or the disk controller 5, and a CPU 7 provides control, including control logic achieving control operations for controlling the overall operations, which will be described later. Furthermore, the cache controller 3 includes a direct memory access (DMA) controller 33 for controlling communication of actual data to and from the cache memory 4, which may be provided as a semiconductor memory or the like, and to and from the disk controller 5.

In this case, in each of the plural disk devices $6x$, a storage area of the rotary storage medium 70 disposed therein is subdivided into an ordinary user area $6xb$ and a secondary cache data area $6xa$. This data area $6xa$ is clearly discriminated from the user data area $6xb$ available for the user's read and write operations.

As for the following operations, the secondary cache data area $6xa$ takes precedence over the user data area $6xb$ according to a sequence of procedures. Namely, for example, in an operation to save cache data $4a$ which has overflowed from the cache memory 4 into a secondary cache data area $6xa3$ and in an operation to read objective data from the secondary cache data storage area $6xa$ in the event of a miss hit of the cache memory 4, the pertinent data in the secondary cache data storage area $6xa$ takes precedence over user data $6xb1$ stored in the user data area $6xb$.

In the cache controller 3, there are provided a cache control table $32a$ to control the cache data stored in the cache memory (FIG. 3) and a secondary cache control table $32b$ to control the secondary cache data area $6xa3$ kept in the secondary cache data storage area $6xa$ (FIG. 4). As for these tables $32a$ and $32b$, when data is stored in an area of the secondary cache data storage area $6xa2$, cache control table (data) $6xa1$ and secondary cache control table (data) $6xa2$ are simultaneously updated.

There can be considered various methods of determining the capacity of the storage area $6xa$. The capacity is not necessarily required to be substantially the same as that of the cache memory. Namely, depending on the system configuration, the capacity may be set to an integral multiple of that of the cache memory 4. Conversely, the capacity of the cache memory 4 may be set to an integral multiple of that of the secondary cache data storage area $6xa$. Alternatively, the capacity of the storage area $6xa$ may be set to a value independent of that of the cache memory 4.

FIG. 17 schematically shows an example of the configuration of the rotary storage medium 70 which may be used in this embodiment. On a recording surface of the medium 70 having a contour like a magnetic disk, there are arranged a plurality of concentric tracks as areas to store data and the like. In a case where there is disposed a plurality of recording surfaces rotating about an identical axis, a group of tracks each having the same radius are collectively controlled as a cylinder $70a$. In the group of tracks belonging to the same cylinder $70a$, access from one track to another can be accomplished without any seek operation (i.e. a radial displacement and a positioning) of the read/write head, not shown. Namely, the access can be conducted simply through an electrical operation. Consequently, in ordinary cases, a data write operation is executed preferentially in those tracks belonging to an identical cylinder 70a.

For example, as shown in the example of FIG. 17, one may allocate several continuous outer cylinders 70a and the remaining inner cylinders 70a to the secondary cache data storage area 6xa and the user data area 6xb, respectively.

Figure 18:
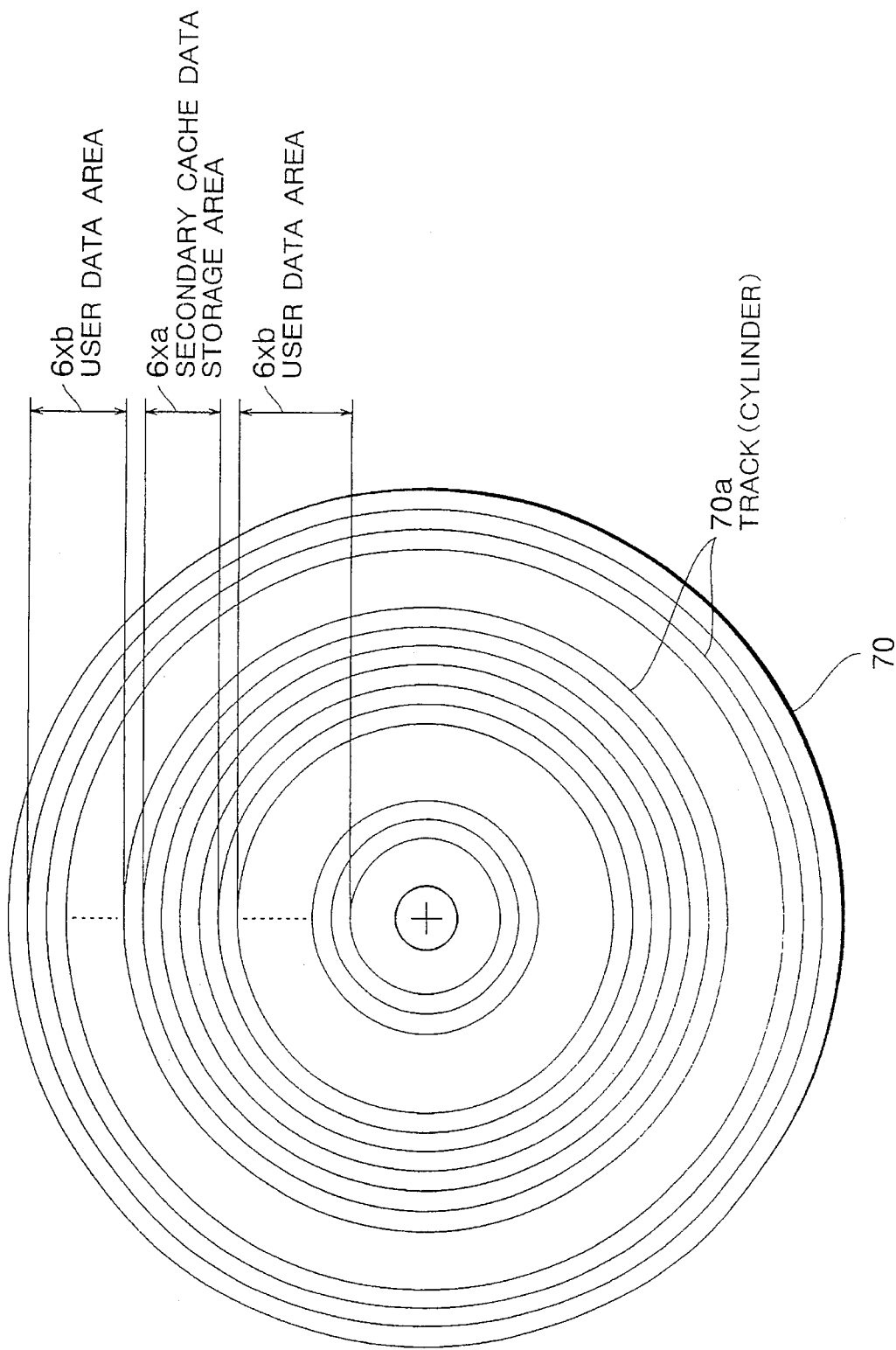
FIG. 18 is a schematic block diagram showing another example of a rotary storage medium in the rotary storage device in an embodiment according to the present invention.

Furthermore, as can be seen from the example of FIG. 18, it may also be possible to allocate several cylinders 70a in the central portion of the group of concentric cylinders 70a to the secondary cache data storage area 6xa and the other inner and outer cylinders to the user data area 6xb. In the case of FIG. 18, the seek distance of the head from a position in the secondary cache data storage area 6xa to a position in the user data area 6xb is relatively decreased.

Figure 19:
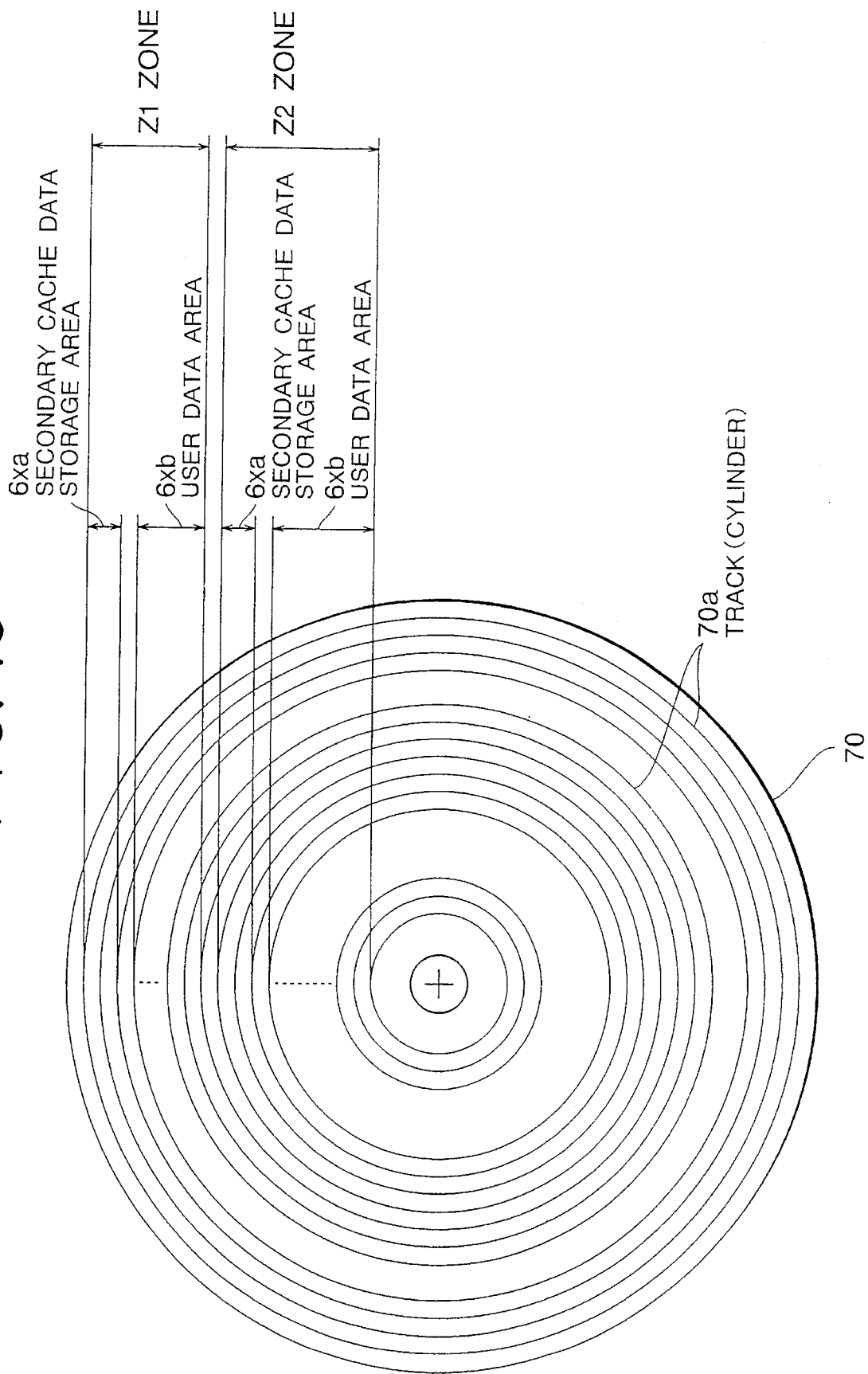
FIG. 19 is a schematic block diagram showing a further example of a rotary storage medium in the rotary storage device in an embodiment according to the present invention.

In addition, as shown in the example of FIG. 19, the group of cylinders 70a arranged in a concentric fashion may be subdivided into a plurality of zones Z1 and Z2 so as to dispose a user data area 6xb and a secondary cache data storage area 6xa associated therewith in each zone.

Figure 20:
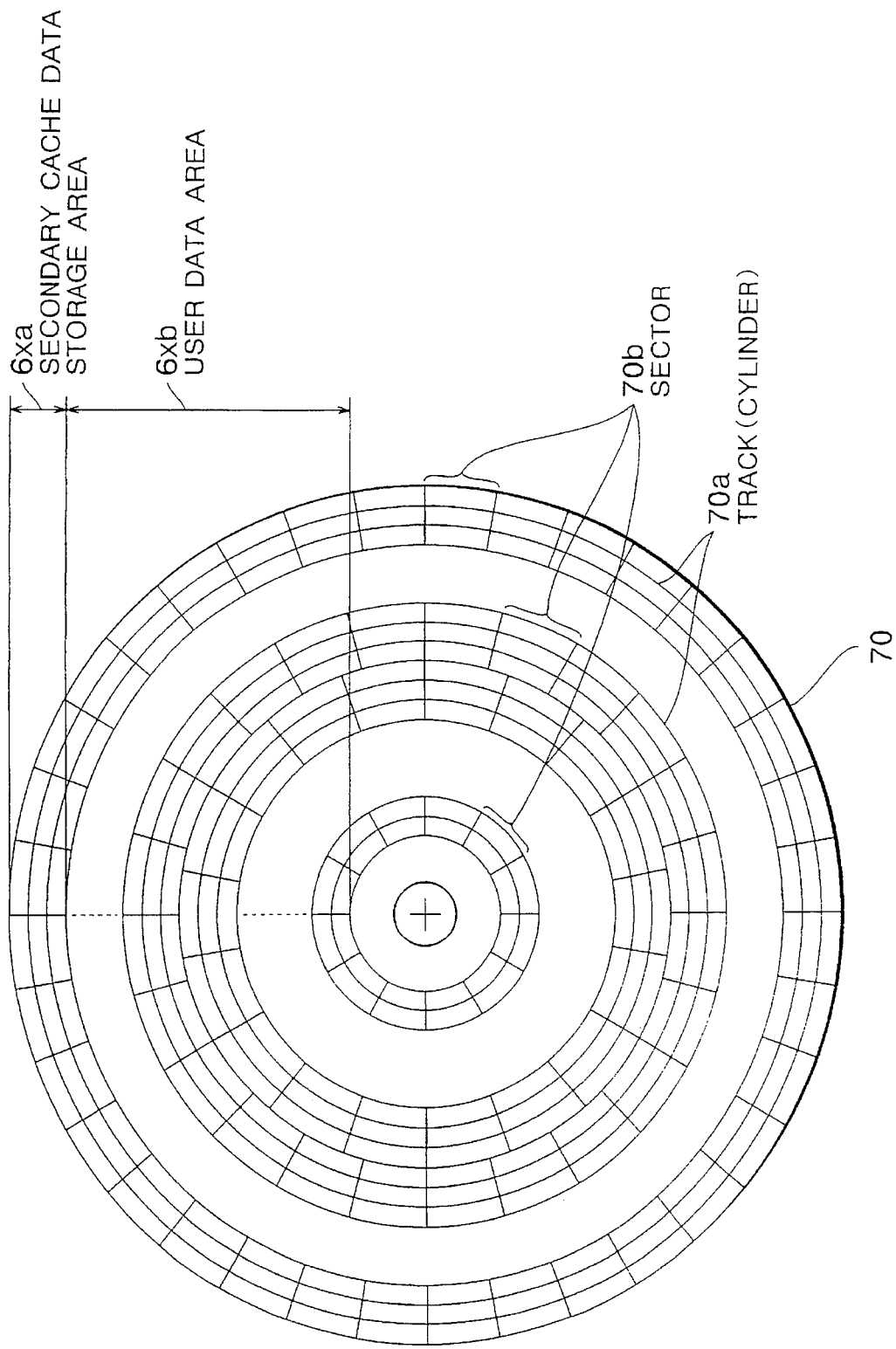
FIG. 20 is a schematic block diagram showing still another example of a rotary storage medium in the rotary storage device in an embodiment according to the present invention.

Furthermore, as shown in the example of FIG. 20, in a case of a so-called constant density recording (CDR) scheme in which the bit recording density per unitary length is substantially fixed regardless of the radii of the tracks, namely, the longer the distance from the center to the pertinent track (cylinder) is, the more the data amount writable in the track (cylinder) is (in other words, the number of sectors 70b to store the unitary data amount is increased), a group of several consecutive outer cylinders 70a and a group of the inner cylinders are allocated to the secondary cache data storage area 6xa and the user data area 6xb, respectively. For the same capacity of the secondary cache data storage area 6xa, this configuration minimizes the number of cylinders 70a necessary to reserve the storage area 6xa, thereby further reducing the period of time required to access the area 6xa.

Description will next be given of an example of operation of the rotary storage device of the embodiment constituted as indicated in FIG. 1.

The CPU 7 references the cache control table (memory) 32a and the secondary cache control table (secondary cache) 32b for data of a logical block address (LBA) contained in an upper-level command request received in association with a read/write request from the host computer 1. Namely, the CPU 7 determines whether the data exists in the cache memory 4, whether the data is missing in the secondary cache data area 6xa3, or whether the data exists in neither. However, almost the entire confirmation job or a portion thereof may be accomplished by the cache controller 3.

When it is confirmed that the data exists in the cache memory 4, a write or rewrite operation of the data is carried out in the cache memory 4 or the secondary cache data storage area 6xa by the DMA controller 33.

Figure 21:
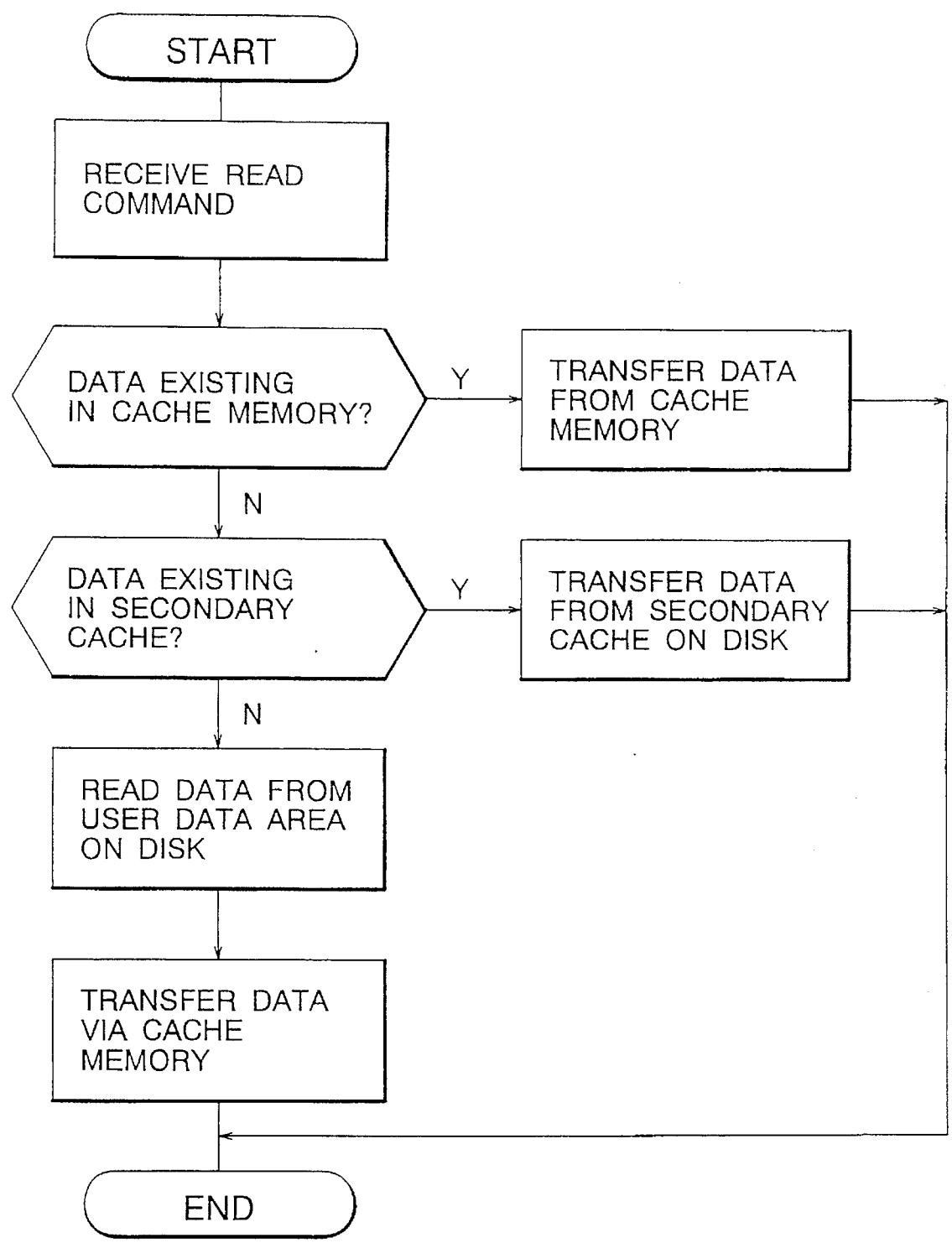
FIG. 21 is a flowchart showing an example of a data read processing in a rotary storage device in an embodiment according to the present invention.

As shown in the flowchart of FIG. 21, in a data read operation, when the data is missing in the cache memory 4 and exists in the secondary cache data area 6xa3 of the disk device 6x, the pertinent disk address of the area 6xa is accessed by the disk controller 5.

In a case where a relatively high hit rate is assumed in the area 6xa3 depending on the processing mode of the host computer 1 operating as the upper-level apparatus, the range of the seek operation is limited to the consecutive cylinders in the area 6xa3. Consequently, in ordinary cases, the period of time required for the read operation is considerably decreased as compared with the conventional read operation in which the write operation is conducted in a random fashion at actual addresses in the user data area 6xb.

When a hit occurs neither in the cache memory 4 nor in the secondary cache data area 6xa3, the pertinent disk address of the user data area 6xb is accessed by the disk controller 5. In this case, the seek operation is achieved according to a random address.

Figure 22:
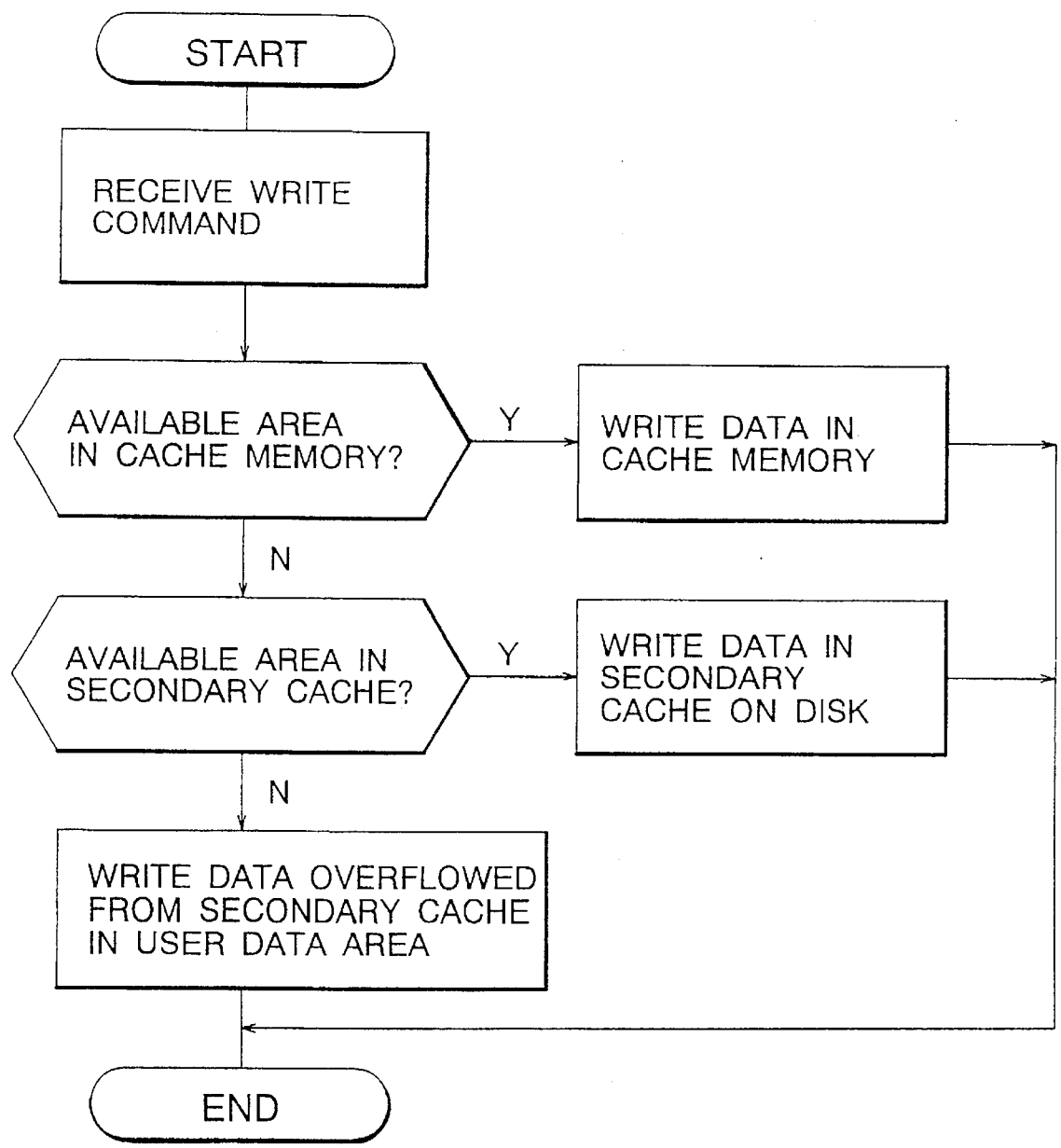
FIG. 22 is a flowchart showing an example of a data write processing in a rotary storage device in an embodiment according to the present invention.
Figure 23:
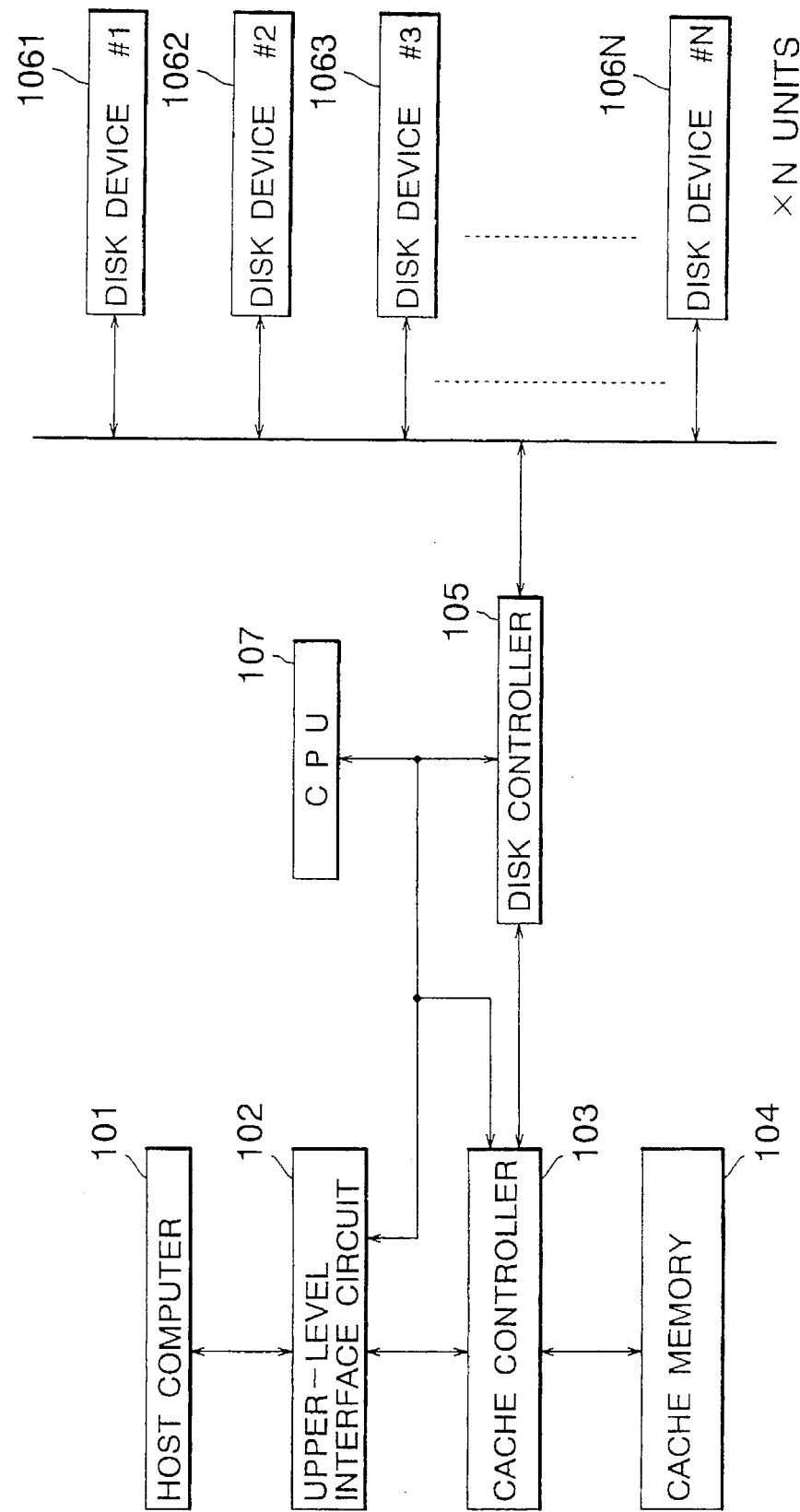
FIG. 23 is a block diagram showing an example of the general construction of a prior art disk device operating in association with a cache memory.

On the other hand, as can be seen from the flowchart of FIG. 22, in a data write operation, when the data is missing in the cache memory 4, the data is written in a free area in the cache memory 4. The command processing is terminated at this point of time.

When no free area is available in the cache memory 4, arbitrary data (i.e., most suitable data judged to be removed from the cache memory 4 according to an algorithm such as a least recently used (LRU) algorithm) is saved from the cache memory 4 into the secondary cache data area 6xa3 of the disk device 6x via the DMA controller 33 and the disk controller 5.

In this operation, the seek operation range is limited to the cylinders of the area 6xa3. In consequence, the period of time required for the write operation is remarkably reduced as compared with the conventional read operation in which the write operation is conducted in a random manner at actual addresses in the user data area 6xb.

In this operation, when no free area is available in the secondary cache data area 6xa3, the arbitrary secondary cache data 6xa4, for example, LRU data is saved from the secondary cache data storage area 6xa into the user area 6xb of the disk device 6x according to the pertinent address by the DMA controller 33 and the disk controller 5.

When it is necessary to save the contents of the cache memory 4 into the disk device 6x due to a power interruption or in association with processing of an upper-level apparatus, the cache table 4a, the cache control table 32a, and the secondary cache control table 32b are temporarily saved from the cache memory 4 into the secondary cache storage area 6xa through a sequential access operation by the DMA controller 33 and the disk controller 5. Since the range of this operation is limited to a group of successive cylinders 70a constituting the area 6xa, the period of time required for the saving operation is considerably minimized as compared with the conventional technology in which the access operation is conducted in a random fashion to the actual user data area 6xb.

The cache data once saved into the area 6xa is restored to the user data area 6xb according to the respective actual addresses at a point of time when a period of time specified by the system has elapsed without any reception of an access request.

To improve the cache hit rate, the following operations may be conducted.

1) At the power-on phase, the secondary cache data may be loaded in the cache memory 4 so that processing will be continuously executed at the time of a power interruption or when the power is turned on again, thereby improving the cache hit rate.

2) When the power is turned on again, if data to be frequently accessed thereafter is known, the data or auxiliary data associated therewith may be loaded in the cache memory 4, the secondary cache data storage area 6xa, or both thereof.

As a result, the cache hit rate is improved.

Figure 3:
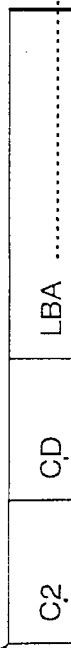
FIG. 3 is a diagram showing an example of a cache control table for use in controlling a cache memory.
Figure 5:
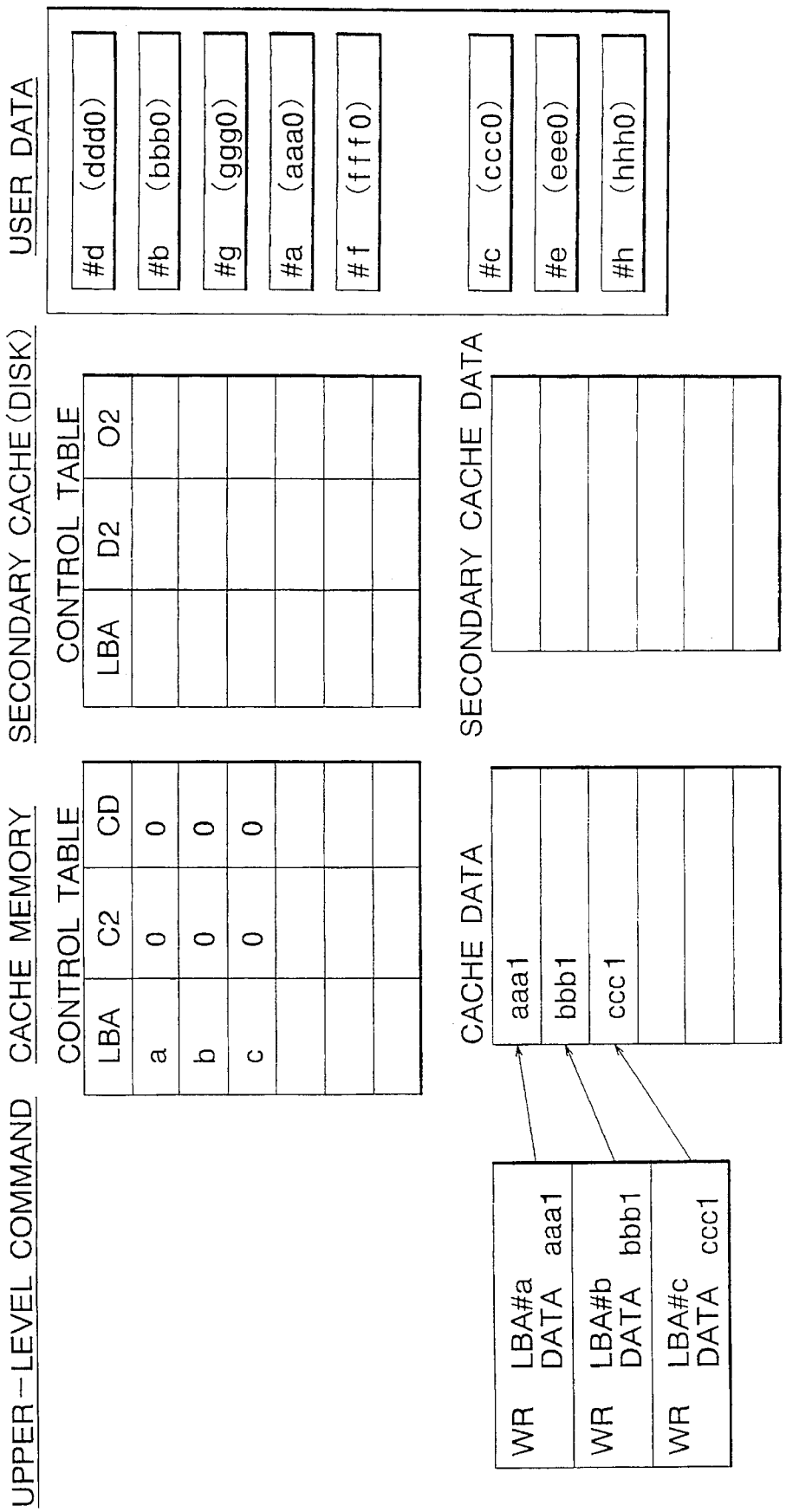
FIG. 5 is a schematic diagram showing an example of transition of data transfer processing between the cache memory, the secondary cache data area, and the user data area.
Figure 6:
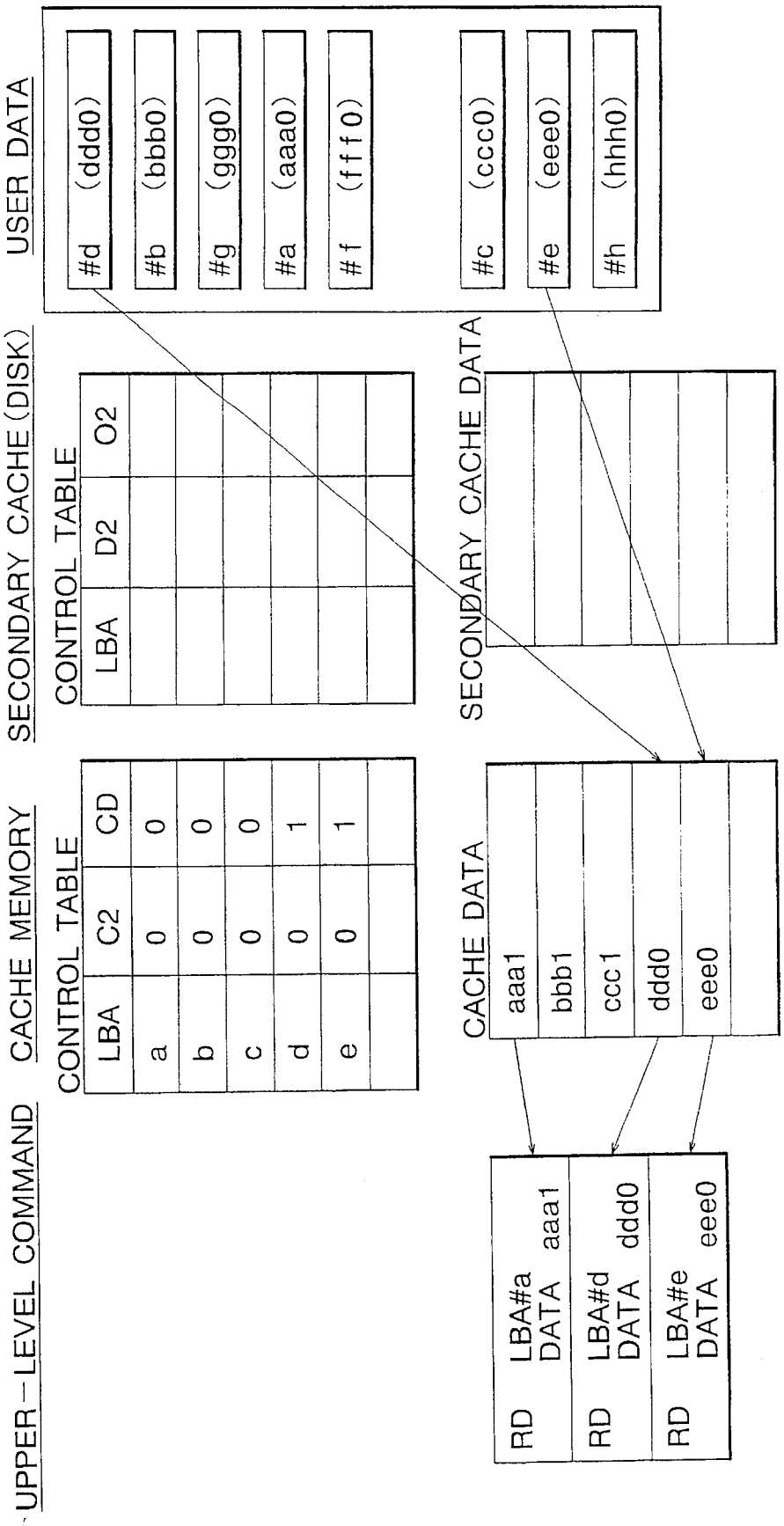
FIG. 6 is a schematic diagram showing another example of transition of data transfer processing between the cache memory, the secondary cache data area, and the user data area.
Figure 7:
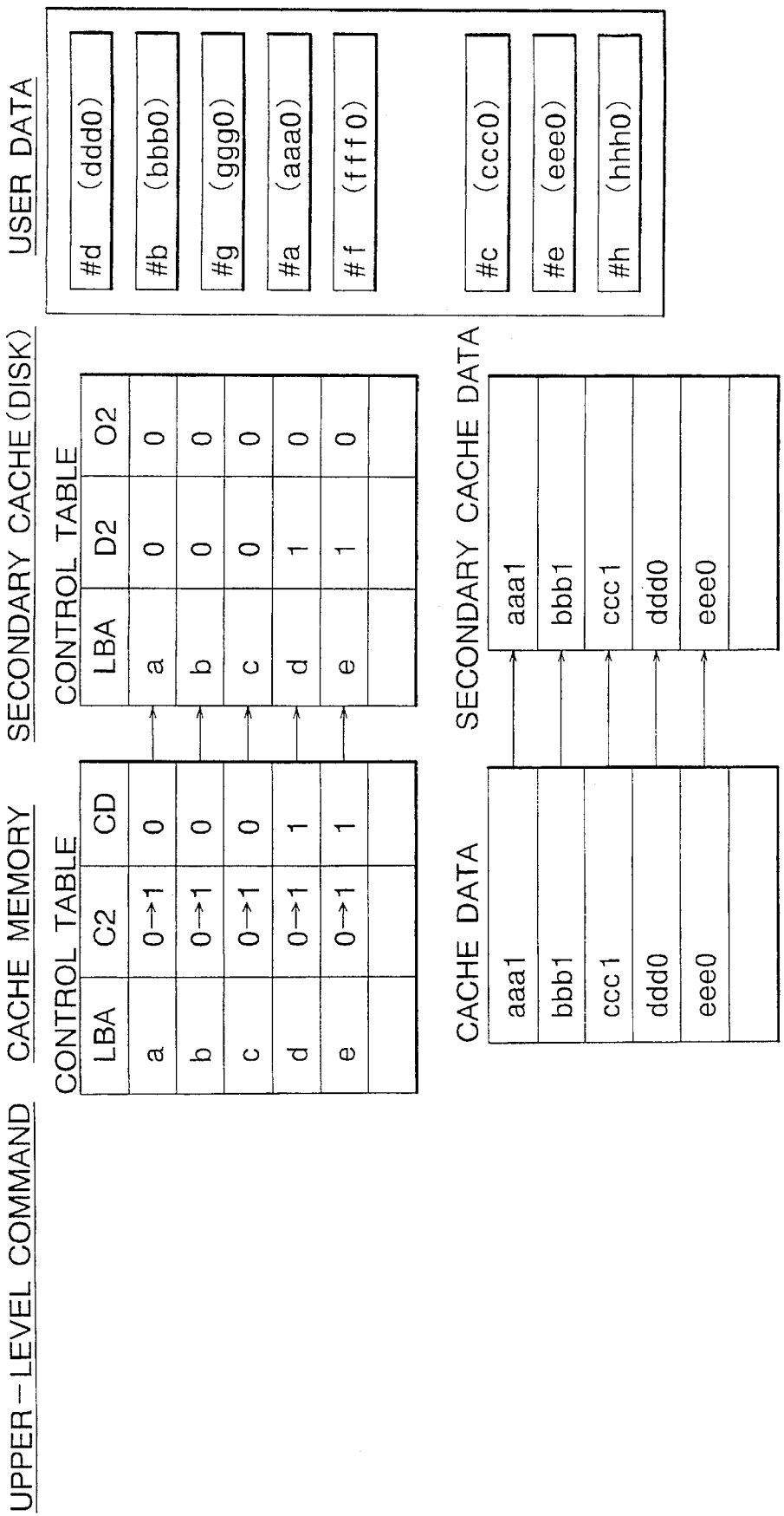
FIG. 7 is a schematic diagram showing still another example of transition of data transfer processing between the cache memory, the secondary cache data area, and the user data area.
Figure 8:
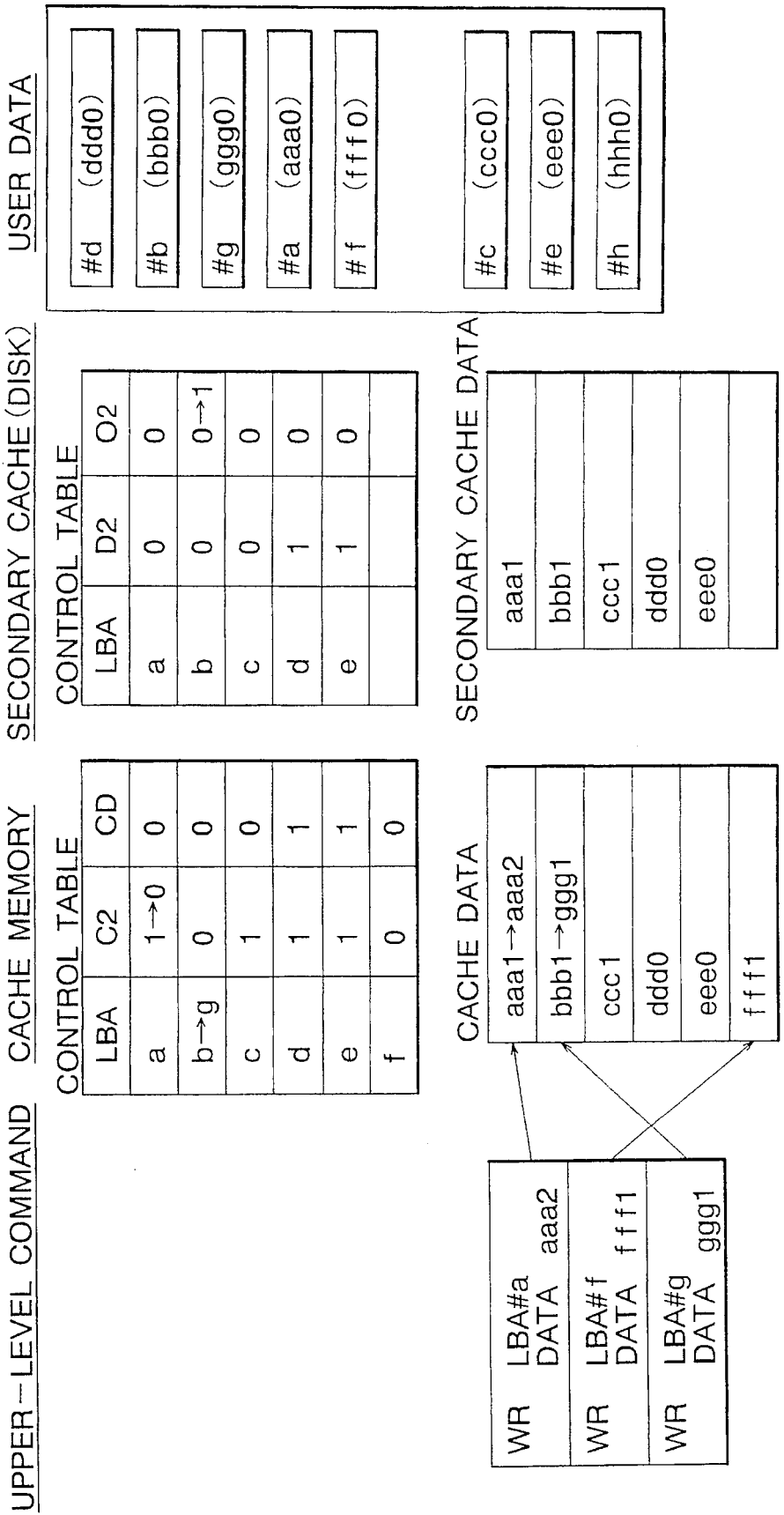
FIG. 8 is a schematic diagram showing a further example of transition of data transfer processing between the cache memory, the secondary cache data area, and the user data area.
Figure 9:
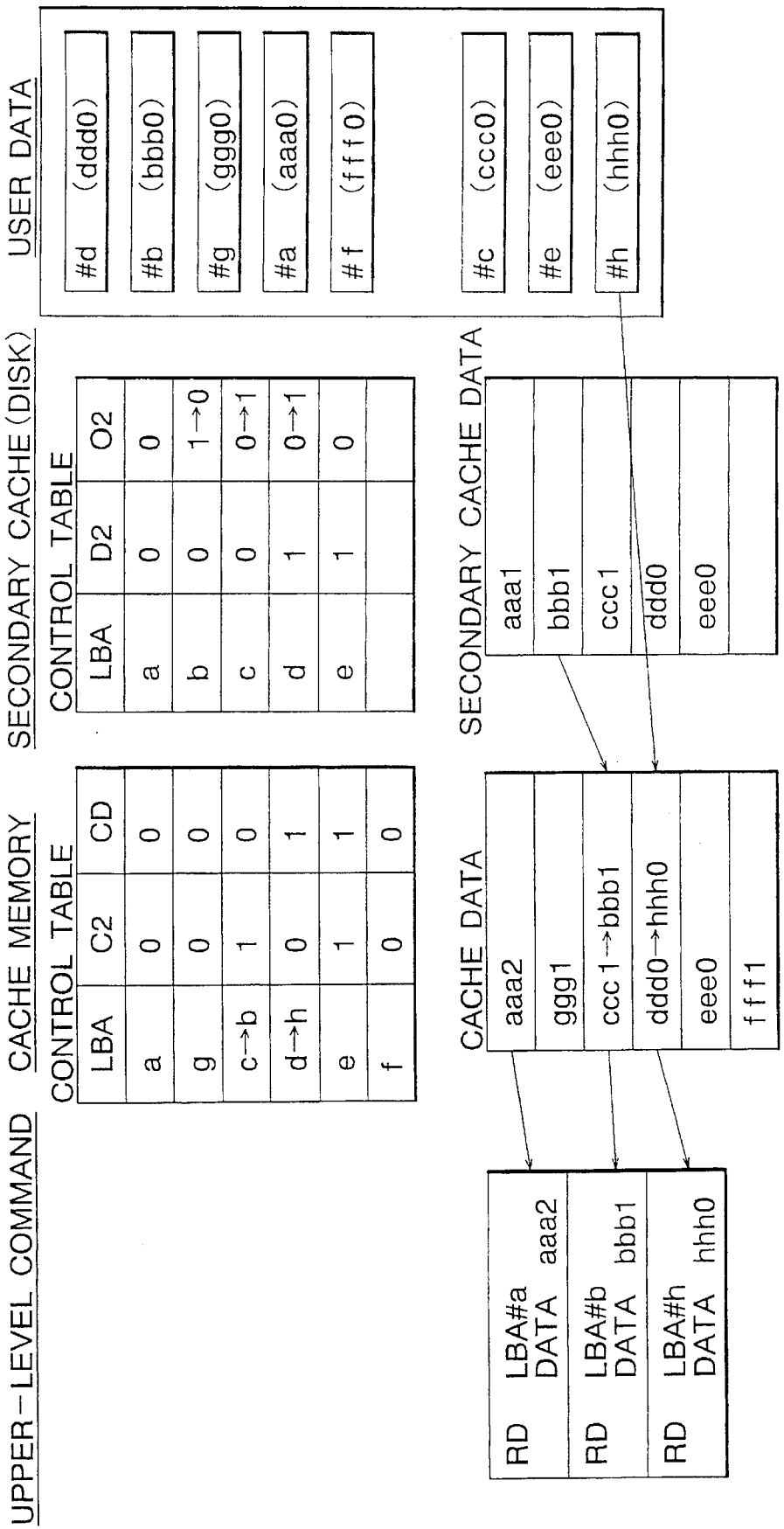
FIG. 9 is a schematic diagram showing another example of transition of data transfer processing between the cache memory, the secondary cache data area, and the user data area.
Figure 11:
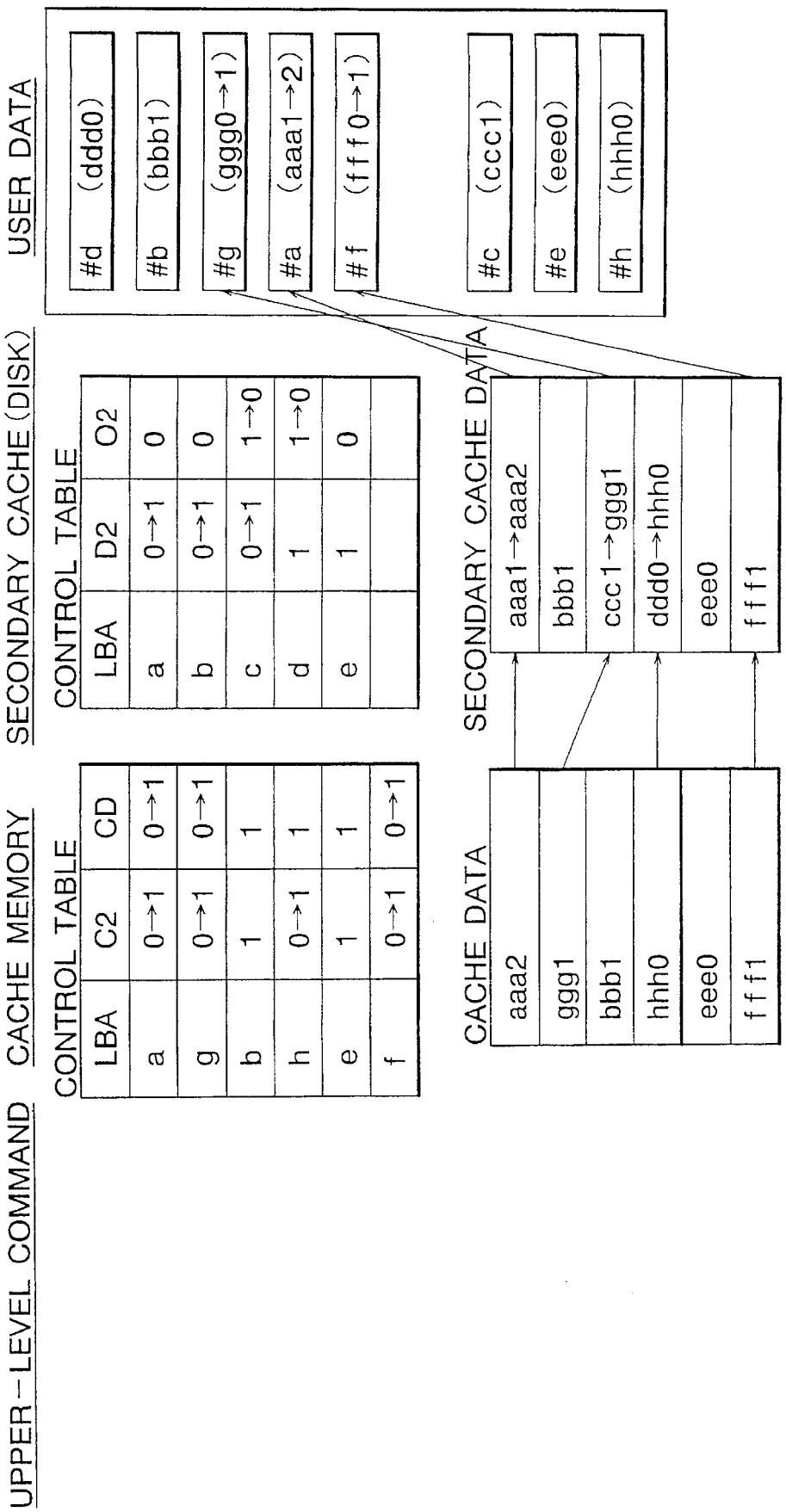
FIG. 11 is a schematic diagram showing a further example of transition of data transfer processing between the cache memory, the secondary cache data area, and the user data area.

FIG. 3 shows an example of the cache memory 4 and the cache control table 32a in this embodiment, whereas FIG. 4 shows an example of the cache data area 6xa3 and the secondary cache control table 32b.

Rows (0 to R-1) and columns (0 to C-1) define at intersections therebetween frames or locations. The locations thus defined respectively in the cache memory 4, the secondary cache data area 6xa3, the cache control table 32a, and the secondary cache control table 32b correspond to each other.

In FIG. 3, in a location of the table 32a corresponding to the memory 4, there is stored a cache control flag 32a-1 (F1) of the pertinent cache data 4a. The flag 32a-1 includes an LBA (logical address of data) and two control flags, namely, a control flag C2 (=1 when the data 4a matches the data 6xa4), and a control flag CD (=1 when the data 4a matches the data 6xb1).

In FIG. 4, in a location of the secondary cache control table 32b corresponding to the secondary cache data area 6xa3, there is stored a secondary cache control flag 32b-1 (F2) of the pertinent secondary cache data 6xa4.

The flag 32b-1 includes an LBA (logical address of data) and two control flags, i.e., a control flag D2 (=1 when the data 6xb1 in the disk device 6x matches the data 6xa4) a control flag O2 (=1 when the data 6xa4 is overflowed the cache memory 4).

FIGS. 5 to 11 show an example of the general processing together with data stored in the cache memory 4 and the secondary cache data storage area 6xa and transitions of the cache control table 32a and the secondary cache control table 32b respectively related thereto.

In a state where initial data (aaa0) to initial data (hhh0) are beforehand written respectively in user area locations at addresses #a to #h, processing is executed as follows. Processing ① FIG. 5: in a case where there is issued from a host computer, operating as an upper-level apparatus, an instruction to write data (aaa1), data (bbb1), and data (ccc1) respectively in locations at addresses #a, #b, and #c, a command termination report is set to the upper-level apparatus when the data is completely written in the cache memory 4.

In this operation, an LBA (logical address) and the control flags C2 and CD are set to the cache control table 32a corresponding to the data of the cache memory At this point of time, the contents of the cache memory 4 are less old than the user data 6xb1 in the disk device 6x and hence the control flag CD is set to 0; whereas, the registration of the data has not been conducted to the secondary cache data storage area 6xa and hence the control flag C2 is set to 0. Processing ② FIG. 6: When an instruction to read data from locations at addresses #a, #d, and #e is issued after the processing ①, since the latest data at #a exists in the cache memory 4, the data (aaa1) is sent from the cache memory 4 to the host computer 1. Since data items at #d and #e are missing in both of the cache memory 4 and the secondary cache data storage area 6xa, the data items are read from the user data area 6xb into the cache memory 4 and are thereafter transmitted to the host computer 1. As a result, the data in the cache memory 4 matches the user data 6xb1 and the control flag CD is consequently set to 1. Processing ③ FIG. 7: In a case where the contents of the cache memory 4 are saved in the secondary cache data storage area 6xa after the processing ②, since the contents of the memory 4 match those of the area 6xa, the control flag C2 is set to 2. For data associated with the control flag CD=1, since the control flag C2 is 1, the control flag D2 is set to 1. Processing ④ FIG. 8: After the processing ③, in a case where there is issued an instruction to write data (aaa2), data (fff1), and data (ggg1) in locations respectively at addresses #a, #f, and #g, the command termination is reported to the upper-level apparatus when the data is completely written in the cache memory 4.

The cache data 4a at #a is updated to the data (aaa2) and hence becomes different from the secondary cache data 6xa4; consequently, the control flag C2 is set to 0.

Since the data items (fff1) and (ggg1) respectively at the address #f and #g are new data items, the control flags CD and C2 are set to 0 and 2, respectively. Although the data at address #b (bbb1) overflows from the cache memory 4, since the data at the address #g is written in the cache memory 4, the data 5 bbb1) is kept in the secondary cache data storage area 6xa. Consequently, the control flag O2 is set to 1. Processing ⑤ FIG. 9: When an instruction to read data items from locations at addresses #a, #b, and #h is issued after the processing ④, since the latest data at #a exists in the cache memory 4, the data (aaa2) is sent from the memory 4 to the host computer 1.

The data at #b is missing in the cache memory 4, but exists in the secondary cache data storage area 6xa. Consequently, the data is transmitted therefrom via the cache memory 4 to the host computer 1. As a result, the data in the cache memory 4 matches that in the area 6xa, and hence the control flag C2 is set to 1. Since the overflowed data is resultantly restored in the cache memory 4, the control flag O2 is set to 0.

The data at #h is neither in the memory 4 nor in the area 6xa and hence is sent from the user data area 6xb via the cache memory 4 to the host computer 1. As a result, the data in the memory 4 matches the user data 6xb1 in the area 6xb, and hence the control flag CD is set to 1. Although the data at #c (ccc1) overflows from the memory 4 because the data at #b is written therein, the data at #c is kept in the area 6xa. Consequently, the control flag O2 is set to 1. Processing ⑥ FIG. 10: When the contents of the secondary cache data storage area 6xa are written in the user data area 6xb after the processing ⑤, since the data in the area 6xa matches that in the area 6xb, the control flag D is set to 1. For the data associated with the control flag C2=1, the control flag CD is set to 1 because the control flag D2 is 1. Processing ⑦ FIG. 11: When the contents of the cache memory 4 are in the user data area 6xb after the processing ⑤, the processing ⑥ is first executed and then the data is saved from the memory 4 into the secondary cache data storage area 6xa. In this state, the data written in the memory 4 up to this point of time has already been saved from the user data area 6xb into the area 6xa (at least the control flag CD=1 or C2=1 for each data). Consequently, the power may be turned off.

At an arbitrary point of time thereafter, there is selected from the secondary cache data 6xa4 in the area 6xa any data (of which the control flag CD=0 and the control flag D2=0) to update the user data area 6xb, which is then written in the area 6xb.

In operation, in a case where any data item in the cache memory 4 has been already saved, the control flags are established as C2=1, CD=1, D2=1, and O2=0.

In a case where the processing is re-started due to a power interruption during the system operation, the control flags are set as C2=0, CD=0, D2=1, and O2=1. In this state, when the contents of the secondary cache data storage area 6xa are loaded (through an up-load operation) into the cache memory 4, the control flags are set as C2=1, CD=1, D2=1, and O2=0.

FIGS. 12 to 16 show states of the cache control table 32a and the secondary cache control table 32b updated through the processing described above.

FIG. 12 shows the processing ① of a write command when the cache memory 4 has empty areas.

FIG. 13 shows the processing ④ in a case where a data overflow occurs in the cache memory 4 due to a write command.

FIG. 14 shows the processing ⑤ of a read command.

FIG. 15 shows the processing ⑥ in a case where the contents of the secondary cache data storage area 6xa are saved into the user data area 6xb.

FIG. 16 shows the processing ⑦ in a case where the contents of the cache memory 4 are saved into the user data area 6xb.

These diagrams respectively show in the table format the states of cache control flags during the execution of processing, the effectiveness (latest state) of the data of the secondary cache data storage area 6xa and the user data area 6xb, the data update path through the processing, and the states of cache control flags after the processing.

As indicated above, according to the cache control method and the rotary storage device of this embodiment, the capacity of the cache memory 4, constituted by a recording media, such as a semiconductor memory of a high bit cost, is substantially expanded by the secondary cache data storage area 6xa disposed in a portion of the rotary storage medium 70 of a low bit cost, thereby increasing the cache hit rate at a low cost.

Moreover, since the read operation of the rotary storage medium 70 at the time of a miss hit of the cache memory 4 is executed for the secondary cache data storage area 6xa arranged in a group of particular consecutive cylinders, the seek time can be minimized.

That is, according to the prior art operation for accessing the disk device 6x to save data from the cache memory 4 into the disk device 6x, there is achieved a random write operation through substantially all of the areas of the rotary storage medium 70. In contrast thereto, according to the present invention, there is conducted a sequential write operation for the secondary cache data storage area 6xa configured with several particular successive cylinders, which consequently reduces the processing time and minimizes the battery backup time in the event of a power interruption.

In consequence, it is possible to simplify, for example, the facility of the backup power for the cache memory 4, which contributes to reduction of the production cost of the apparatus.

Furthermore, to access the secondary cache data storage area 6xa, there can be employed an access procedure which is quite suitable for the application program executed by the host computer, thereby increasing the hit rate in the access to the area 6xa.

For example, the hit rate can be improved as follows.
1) The cache control method of the invention is applied to an application having a higher possibility of accessing again data which has overflowed from the cache memory 4.
2) Data assumed to have a high access frequency is beforehand stored in the secondary cache data storage area 6xa.

In addition, depending on the application programs, when it is desired to obtain a high access speed even by sacrificing the data capacity thereof, there may be disposed a plurality of secondary cache data storage areas 6xa. Also, in this case, since the bit cost of the rotary storage medium 70, such as a magnetic disk, is lower than that of the cache memory 4, in the form of a semiconductor memory or the like, the expansion can be easily conducted without increasing the cost. Moreover, this does not lead to an increase in the installation space.

Embodiment 2

Figure 2:
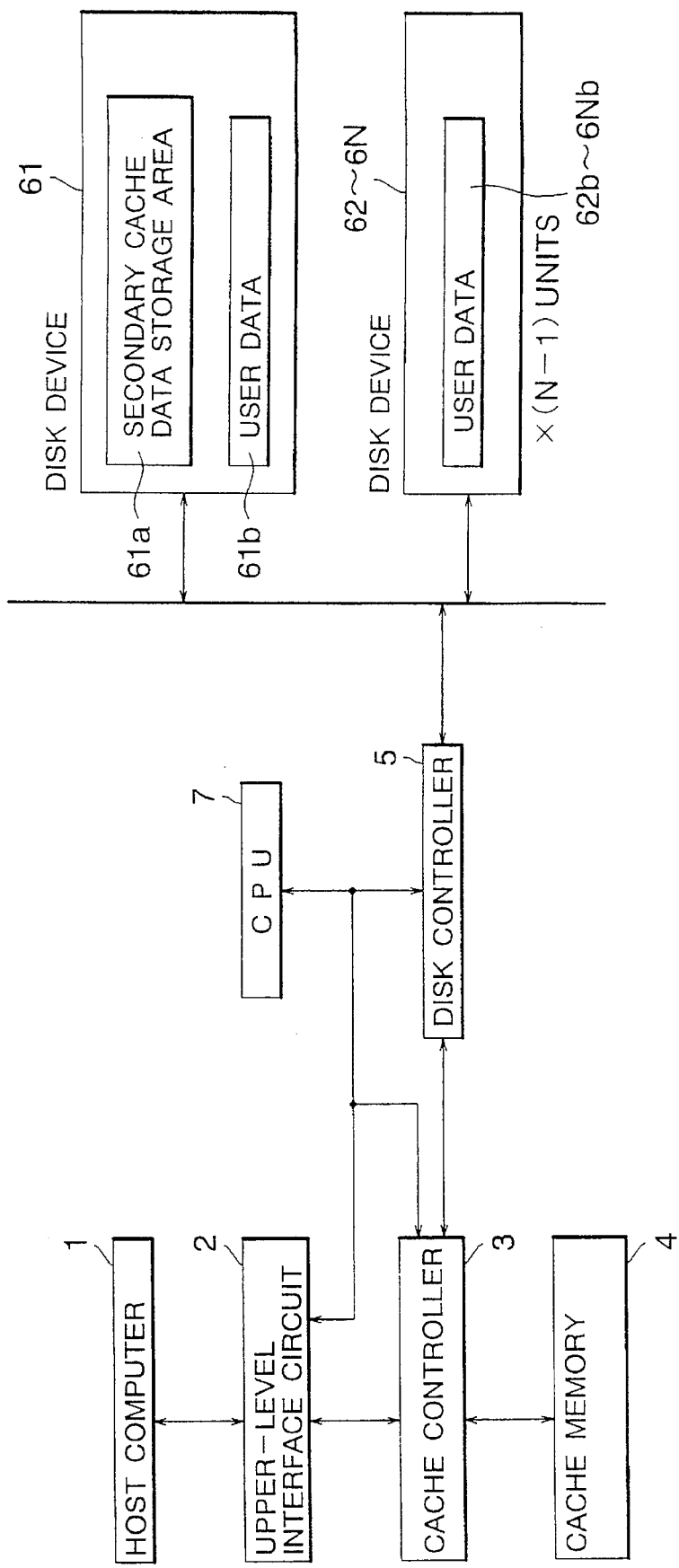
FIG. 2 is a schematic block diagram showing an example of a rotary storage device in another embodiment according to the present invention.

FIG. 2 shows an example of the construction of a rotary storage device in another embodiment according to the present invention. The embodiment differs from the first embodiment in that, for N disk devices 6x (x=1 to N) under control of the disk controller 5, the secondary cache data storage area 61a is provided in only one disk device 6x selected therefrom.

In FIG. 2, the internal configurations respectively of the storage area 61a and the cache controller 3 are the same as those of the first embodiment shown in FIG. 1.

Although not specifically shown, the N disk devices under control of the disk controller 5 may be subdivided into several groups such that in each group, the storage area 61a is provided in one of the disks belonging to the group.

Also in the second embodiment, there can be obtained an advantage similar to that of the first embodiment.

Comparative Example

In the cache control method and the rotary storage device according to the present invention, the operation to save 16 megabyte of data from the cache memory into the secondary cache area is achieved through an I/O processing for the secondary cache area. The processing time $T_{PI}$ necessary for this I/O operation is represented as follows.

$T_{PI}$ = (disk write time for 16 MB data) +

(delay time related to head alignment) +

(overhead time of controller)

For the expression above, using values of the respective items for a 5 inch disk device of the type generally used at present, the processing time $T_{PI}$ is obtained as follows.

$$\begin{aligned} T_{PI} &= (11.1 \text{ ms}) \times (32768/80) + \\ &\quad (2 \text{ ms}) \times (32768/80) + \\ &\quad (1 \text{ ms}) \\ &= 5.3 \text{ seconds.} \end{aligned}$$

That is, as compared with $T_{PC}$=23.8 ms ×1000 of the conventional example, the I/O processing time is remarkably reduced to about one fifth according to the present invention.

Moreover, assume that the capacity of the cache memory is increased, for example, from 16 MB to 32 MB to improve the hit rate of the cache memory. In consideration of the present state of the art in which the ratio between the megabyte cost of the 16 MB DRAM and that of the ordinary magnetic disk medium is about 60 to one, the ratio with respect to any increase in the cost to improve the bit rate according to the present invention is about 1/60 when compared with the prior art.

Furthermore, the user area of the rotary storage medium which is sacrificed for this purpose is represented as follows.

32768 sectors 1/80 sectors/track 1/20 tracks/cylinder=about 20 cylinders. Namely, since the total number of cylinders of the disk is about 3000 cylinders, only about 0.67% is sacrificed.

According to an investigation of the present inventors, in the case where the disk subsystem including the rotary storage devices has the total capacity of ten gigabytes (GB), a simulation test has been conducted for the cache hit rate in an example of a bench mark including a relational data base (RDB). For a cache capacity of 16 MB (0.16% of the total capacity) and a cache capacity of 32 MB (0.32% of the total capacity), the cache hit rates are resultantly obtained as about 10% and about 20%, respectively. For the actual job, it is quite effective to improve the hit rate bs providing the secondary cache area in a portion of the rotary storage medium.

In the case of an application using the cache control method and the rotary storage device according to the present invention, in such processing as an online terminal processing of a bank or a clinical processing to write a clinical chart of a patient in a hospital, even when data overflows in the ordinary daytime operation from the cache memory due to random read and modify write operations of a large amount of small-sized data items associated with the overall data of the user area in the rotary storage media, I/O operations can be achieved through sequential write operations thanks to the secondary cache area disposed in the particular consecutive areas of the rotary storage media, thereby minimizing the seek time, the latency, and the response time. The data accumulated in the secondary cache area during the daytime operation is written in the user area in which the data is inherently to be stored, thereby avoiding any inconvenience in the job.

While the present invention devised by the inventors has been described with reference to particular illustrative embodiments, it is not to be restricted by those embodiments but only by the appended claims. It is to be appreciated that those skilled in the art can change or modify the embodiments without departing from the scope and spirit of the present invention.

What is claimed is:

1. A cache control method in which in a transfer path on which data is communicated between a rotary storage medium an upper-level apparatus, a cache memory is provided to hold therein a copy of the data in a said rotary storage medium such that for at least either one of a data read request from said upper-level apparatus to read data from the rotary storage medium and a data write request from said upper-level apparatus to write data in the rotary storage medium, a response thereto is performed by use of said cache memory and a cache controller, comprising the steps of:

subdividing said rotary storage medium into an ordinary user area and a secondary cache area; and executing at least either one of a write processing to save, at sequential addresses of said secondary cache area in the rotary storage medium, data which has overflowed from said cache memory, and a read processing to read, in response to a cache miss indicating that data requested by the data read request is missing in said cache memory, data from the rotary storage medium, said read processing being executed preferentially for the sequential addresses of said secondary cache area of said rotary storage medium and sequentially for said ordinary user area when the data is not present in said secondary cache area.

2. A cache control method according to claim 1, further including the steps of:

providing in the cache controller a first control table for controlling the cache memory and a second control table for controlling the secondary cache area; and storing copies respectively of the first and second control tables in the secondary cache area.

3. A cache control method according to claim 1, further including the step of setting by use of the cache controller a ratio between a storage capacity of the cache memory and that of the secondary cache area according to an access state from the upper-level apparatus to the rotary storage medium.

4. A cache control method according to claim 3, further including the steps of:

setting the storage capacity of the secondary cache area to be variable; and expanding the secondary cache area when a utilization ratio of the storage capacity of the secondary cache area exceeds a predetermined threshold value.

5. A rotary storage device comprising:

a rotary storage medium and a cache memory provided in a transfer path on which data is communicated between said rotary storage medium and an upper-level apparatus, said cache memory holding therein a copy of the data in the rotary storage medium, such that for at least either one of a data read request from the upper-level apparatus to read data from the rotary storage medium and a data write request from the upper-level apparatus to write data in the rotary storage medium, data is transferred by use of the cache memory, wherein said rotary storage device includes subdividing means for subdividing a storage area of said rotary storage medium into a randomly accessible ordinary user area and a sequentially accessible secondary cache area and preferential execution means for executing at least either one of a write processing to save at sequential addresses of said secondary cache area in the rotary storage medium data which has overflowed from the cache memory, and a read processing to read, in response to detection of a cache miss indicating that data requested by the data read request is missing in the cache memory, data from the rotary storage medium, the read processing being executed preferentially for the sequential addresses of said secondary cache area and secondarily for the ordinary user area when the data is not present in said secondary cache area.

6. A rotary storage device according to claim 5, wherein:

said rotary storage medium includes a plurality of rotary storage medium units operating in a mutually independent manner; and said subdividing means assigns a particular one of said plurality of rotary storage medium units to the secondary cache area for storage of data at sequential addresses therein.

7. A rotary storage device according to claim 5, further including:

monitor means for monitoring data transfer between the upper-level apparatus and the cache memory and data transfer between the cache memory and the secondary cache area; and first control logic means responsive to a result of operation of said monitor means for executing at an optimum timing a data transfer from the cache memory to the secondary cache area and a data transfer from the secondary cache area to the user area.

8. A rotary storage device according to claim 5, further including:

measuring means for measuring the frequency of accesses to particular data in the user area of the rotary storage medium; and second control logic means responsive to a result of the measuring of the access frequency by the measuring means for copying prior to an actual access operation of the storage device, data having a high access frequency from the user area onto the secondary cache area.

9. A rotary storage device according to claim 5, wherein:

said rotary storage medium includes concentrically arranged cylinders, each cylinder having substantially an identical radius and a plurality of tracks serving as data recording areas; and said subdividing means assigns a group of consecutive cylinders in a central portion with respect to the cylinder arranging direction of the rotary storage medium to the secondary cache area.

10. A rotary storage device according to claim 5 wherein:

said rotary storage medium includes concentrically arranged cylinders, each cylinder having substantially an identical radius and a plurality of tracks serving as data recording areas; and said subdividing means operating to subdivide said plurality of cylinders into several zones, each zone including a group of consecutive cylinders, and to set for each of the zones a secondary cache area by use of a portion of the consecutive cylinders included in the zone.

11. A rotary storage device according to claim 5, wherein:

said rotary storage medium includes concentrically arranged cylinders, each cylinder having substantially an identical radius and a plurality of tracks serving as data recording areas, and said rotary storage medium has, independently of a track radius, a substantially fixed bit recording density per unitary length for each of the tracks of the plurality cylinders, including inner and outer cylinders; and said subdividing means sets the secondary cache area by use of the outer cylinders, each outer cylinder having a relatively large information recording capacity per cylinder.

12. A rotary storage device according to claim 5, wherein:

a cache controller controlling the cache memory includes a first control table for controlling said cache memory and a second control table for controlling said secondary cache area; and said secondary cache area stores therein copies respectively of said first and second control tables.

13. A rotary storage device according to claim 5, further including a processor for controlling a cache controller and a medium controller, wherein:

said subdividing means and said preferential execution means operate in accordance with instructions from said processor; and said secondary cache area is set for an execution of a sequential access to the medium.

14. A rotary storage device comprising:

a rotary storage medium;

a cache memory, provided in a data transfer path between the rotary storage medium and an upper-level apparatus, for holding therein a copy of data in the rotary storage medium;

a first controller for controlling said cache memory;

a second controller for controlling said rotary storage medium;

a processor responsive to an indication from the cache memory to a data read request from the upper-level apparatus to read data from the rotary storage medium or to a data write request from the upper-level apparatus to write data in the rotary storage medium for controlling said first and second controllers;

area specifying means for subdividing the rotary storage medium into a randomly accessible ordinary user area and a secondary cache area which enables a sequential access to the rotary storage medium; and secondary cache area access control means responsive to a result of monitoring of the cache memory for performing in cooperation with said area specifying means at least one of a saving write processing to write at sequential addresses in said secondary cache area in the rotary storage medium data which has overflowed from the cache memory and a read processing operative in response to absence of data specified by a read request in the cache memory to read data from sequential addresses said secondary cache area of the rotary storage medium.

15. A rotary storage device according to claim 14, wherein:

said cache controller includes a first control table for controlling the cache memory and a second control table for controlling the secondary cache area;

said secondary cache area stores therein copies respectively of the first and second control tables; and said control processor and/or said cache controller refers to the first and second control tables and thereby initiates said access control means.

16. A rotary storage device according to claim 14, wherein:

said upper-level apparatus includes a host computer; and said area specifying means executes the subdivision setting of the user area and the secondary cache area in accordance with an instruction from the host computer.

17. A rotary storage device according to claim 14, wherein:

said area specifying means includes a control processor and a control data area disposed in the medium area to store therein data setting a medium area subdivision; and the control processor refers to the control data area to thereby set the medium area subdivision.

18. A rotary storage device according to claim 14, wherein said area specifying means executes the subdividing processing in a program-implemented manner.

19. A rotary storage device comprising:

a rotary storage medium having a randomly accessible user area for storing user data and a sequentially accessible secondary cache area for temporally storing data transferred between said user area and an upper-level apparatus;

a cache memory provided in a transfer path between said rotary storage medium and said upper-level apparatus, for temporally storing data transferred between said user area and said secondary cache area, and said upper-level apparatus; and copying means for copying data of the cache memory to sequential addresses in said secondary cache area so that in response to a request from said upper-level apparatus to read data from said rotary storage medium, the requested data is transferred to said upper-level apparatus from said cache memory when the requested data is present in said cache memory, and the requested data is transferred to said upper-level apparatus by sequential access from said secondary cache area through said cache memory when said data is missing in said cache memory and is present in said secondary cache area.

20. A rotary storage device according to claim 19, wherein:

said rotary storage medium includes a plurality of rotary storage medium units operating in a mutually independent manner; and further including:

subdividing means for assigning a particular one of said plurality of rotary storage medium units to the second cache area for storage of data at sequential addresses therein.

21. A rotary storage device according to claim 20, wherein:

said rotary storage medium includes concentrically arranged cylinders, each cylinder having substantially an identical radius and a plurality of tracks serving as data recording areas; and said subdividing means operating to assign a group of consecutive cylinders in a central portion with respect to the cylinder arranging direction of the rotary storage medium to the secondary cache area.

22. A rotary storage device according to claim 20, wherein:

said rotary storage medium includes concentrically arranged cylinder, each cylinder having substantially an identical radius and a plurality of tracks serving as data recording areas; and said subdividing means operating to subdivide said plurality of cylinders into several zones, each zone including a group of consecutive cylinders, and to set for each of the zones a secondary cache area by use of a portion of the consecutive cylinders included in the zone.

23. A rotary storage device according to claim 20, wherein:

said rotary storage medium includes concentrically arranged cylinders, each cylinder having substantially an identical radius and a plurality of tracks serving as data recording areas, and said rotary storage medium has, independently of a track radius, a substantially fixed bit recording density per unitary length for each of the tracks of the plurality cylinders, including inner and outer cylinders; and said subdividing means sets the secondary cache area by use of the outer cylinders, each outer cylinder having a relatively large information recording capacity per cylinder.

24. A rotary storage device according to claim 20, further including a processor for controlling a cache controller and a medium controller, wherein:

said subdividing means and said copying means operate in accordance with instructions from said processor; and said secondary cache area is set for an execution of a sequential access to the medium.

25. A rotary storage device according to claim 19, further including:

monitor means for monitoring data transfer between the upper-level apparatus and the cache memory and data transfer between the cache memory and the secondary cache area; and first control logic means responsive to a result of operation of said monitor means for executing at an optimum timing a data transfer from the cache memory to the secondary cache area and a data transfer from the secondary cache area to the user area.

26. A rotary storage device according to claim 21, further including:

measuring means for measuring the frequency of accesses to particular data in the user area of the rotary storage medium; and second control logic means responsive to a result of the measuring of the access frequency by the measuring means for copying, prior to an actual access operation of the storage device, data having a high access frequency from the user area onto the secondary cache area.

27. A rotary storage device according to claim 19, wherein a cache controller for controlling said cache memory comprises a first cache control table including a first cache control flag indicating that data on the rotary storage medium coincides with corresponding cache data and a second cache control flag indicating that data on the secondary cache area coincides with corresponding cache data, and a second cache control table including a third cache control flag indicating that data on the rotary storage medium coincides with corresponding secondary cache data and a fourth cache control flag indicating that data on the secondary cache area is missing in the cache memory, and wherein said secondary cache area stores a copy of said first and second cache control tables.

28. A rotary storage device comprising:

a rotary storage medium;

area setting means for partitioning said rotary storage medium into a randomly accessible user area storing user data and a secondary cache area temporally storing at sequential addresses data which has been transferred between said user area and an upper-level apparatus to enable a sequential access to data in said secondary cache area;

a cache memory provided in a transfer path between said rotary storage medium and said upper-level apparatus, for temporally storing data transferred between said user area, said secondary cache area and said upper-level apparatus;

a first controller for controlling said cache memory;

a second controller for controlling said rotary storage medium;

a processor for controlling said first and second controllers; and secondary cache area access control means for performing copying of data stored in said cache memory by sequential access to said secondary cache area and performing a transfer of requested data stored in said secondary cache area by sequential access to the upper-level apparatus through said cache memory, when the data is present in the secondary cache area, but missing in the cache memory, in response to a request from said upper-level apparatus to read data from said rotary storage medium.

29. A rotary storage device according to claim 28, wherein one of said first and second controllers comprises a first cache control table including a first cache control flag indicating that data on the rotary storage medium coincides with corresponding cache data and a second cache control flag indicating that data on the secondary cache area coincides with corresponding cache data, and a second cache control table including a third cache control flag indicating that data on the rotary storage medium coincides with corresponding secondary cache data and a fourth cache control flag indicating that data on the secondary cache area is missing in the cache memory, said secondary cache area storing a copy of said first and second cache control tables, and wherein said control processor refers to said first and second control tables to initiate operation of said access control means.

30. A rotary storage device according to claim 28, wherein:

said upper-level apparatus includes a host computer; and said area setting means executes a subdivision of the user area and the secondary cache area in accordance with an instruction from the host computer.

31. A rotary storage device according to claim 28, wherein:

said area setting means includes a control processor and a control data area disposed in the medium area to store therein data setting a medium area subdivision; and the control processor refers to the control data area to thereby set the medium area subdivision.

32. A rotary storage device according to claim 28, wherein said area setting means executes a subdividing processing in a program-implemented manner.

* * * * *